United States Patent
Kanode et al.

(10) Patent No.: US 8,498,202 B2
(45) Date of Patent: Jul. 30, 2013

(54) METHODS, SYSTEMS, AND COMPUTER READABLE MEDIA FOR DIAMETER NETWORK MANAGEMENT

(75) Inventors: Mark Edward Kanode, Apex, NC (US); Kedar Kashinath Karmarkar, Pune (IN); Thomas M. McCann, Raleigh, NC (US); David Michael Sprague, Raleigh, NC (US); Mahesh Tomar, Morrisville, NC (US); Donald E. Wallace, Evergreen, CO (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 97 days.

(21) Appl. No.: 13/026,153

(22) Filed: Feb. 11, 2011

(65) Prior Publication Data

US 2011/0199895 A1    Aug. 18, 2011

Related U.S. Application Data

(60) Provisional application No. 61/304,310, filed on Feb. 12, 2010.

(51) Int. Cl.
*G01R 31/08* (2006.01)

(52) U.S. Cl.
USPC ....................................................... 370/225

(58) Field of Classification Search
USPC ......... 370/203, 204–215, 229–240, 310–394, 370/395.1, 395.3, 395.4, 395.41, 395.42, 370/395.5, 395.52, 395.53, 412–421, 431–529
See application file for complete search history.

(56) References Cited

U.S. PATENT DOCUMENTS

| | | | |
|---|---|---|---|
| 5,228,083 | A | 7/1993 | Lozowick et al. |
| 5,719,861 | A | 2/1998 | Okanoue |
| 6,105,034 | A | 8/2000 | Buckler |
| 6,157,621 | A | 12/2000 | Brown et al. |
| 6,273,622 | B1 | 8/2001 | Ben-David |

(Continued)

FOREIGN PATENT DOCUMENTS

| | | |
|---|---|---|
| CA | 2 716 544 A1 | 12/2010 |
| CN | 1700694 A | 11/2005 |

(Continued)

OTHER PUBLICATIONS

Commonly-assigned, co-pending U.S. Appl. No. 13/197,566 for "Methods, Systems, and Computer Readable Media for Distributing Diameter Network Management Information", (Unpublished, filed Aug. 3, 2011).

(Continued)

*Primary Examiner* — Jung-Jen Liu
(74) *Attorney, Agent, or Firm* — Jenkins, Wilson, Taylor & Hunt, P.A.

(57) ABSTRACT

According to one aspect, the subject matter described herein includes a method for providing Diameter network management information in a communications network. The method includes steps occurring at a Diameter signaling router (DSR). The method also includes determining whether successful Diameter communications are available with a first Diameter application. The method further includes in response to determining that successful Diameter communications are not available with the first Diameter application, generating a first Diameter network management message (DNMM) indicating that successful Diameter communications are not available with the first Diameter application. The method also includes sending the first DNMM to a second Diameter node.

24 Claims, 13 Drawing Sheets

U.S. PATENT DOCUMENTS

| | | |
|---|---|---|
| 6,304,273 B1 | 10/2001 | Bonnet |
| 6,366,577 B1 | 4/2002 | Donovan |
| 6,385,198 B1 | 5/2002 | Ofek et al. |
| 6,404,746 B1 | 6/2002 | Cave et al. |
| 6,584,073 B1 | 6/2003 | Steele, Jr. et al. |
| 6,735,291 B1 | 5/2004 | Schmid et al. |
| 6,795,546 B2 | 9/2004 | Delaney et al. |
| 6,865,153 B1 | 3/2005 | Hill et al. |
| 6,915,345 B1 | 7/2005 | Tummala et al. |
| 6,918,041 B1 | 7/2005 | Chen |
| 6,954,790 B2 | 10/2005 | Forslöw |
| 6,967,956 B1 | 11/2005 | Tinsley et al. |
| 7,042,877 B2 | 5/2006 | Foster et al. |
| 7,043,000 B2 | 5/2006 | Delaney et al. |
| 7,136,635 B1 | 11/2006 | Bharatia et al. |
| 7,257,636 B2 | 8/2007 | Lee et al. |
| 7,286,516 B2 | 10/2007 | Delaney et al. |
| 7,292,592 B2 | 11/2007 | Rune |
| 7,298,725 B2 | 11/2007 | Rune |
| 7,308,499 B2 | 12/2007 | Chavez |
| 7,333,438 B1 | 2/2008 | Rabie et al. |
| 7,333,482 B2 | 2/2008 | Johansson et al. |
| 7,383,298 B2 | 6/2008 | Palmer et al. |
| 7,403,492 B2 | 7/2008 | Zeng et al. |
| 7,403,537 B2 | 7/2008 | Allison et al. |
| 7,466,807 B2 | 12/2008 | McCann et al. |
| 7,551,926 B2 | 6/2009 | Rune |
| 7,567,796 B2 | 7/2009 | Tammi et al. |
| 7,583,963 B2 | 9/2009 | Tammi et al. |
| 7,590,732 B2 | 9/2009 | Rune |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,742,421 B2 | 6/2010 | Bantukul et al. |
| 7,792,981 B2 | 9/2010 | Taylor |
| 7,822,023 B2 | 10/2010 | Lahetkangas et al. |
| 7,894,353 B2 | 2/2011 | Li et al. |
| 7,898,957 B2 | 3/2011 | Lea et al. |
| 7,916,685 B2 | 3/2011 | Schaedler et al. |
| 7,929,419 B2 | 4/2011 | Sprague |
| 7,961,685 B2 | 6/2011 | Suh et al. |
| 7,996,007 B2 | 8/2011 | Bantukul |
| 7,996,541 B2 | 8/2011 | Marathe et al. |
| 8,041,021 B2 | 10/2011 | Xu et al. |
| 8,045,983 B2 | 10/2011 | Bantukul |
| 8,170,035 B2 | 5/2012 | Furey et al. |
| 8,170,055 B2 | 5/2012 | Fang et al. |
| 2001/0024443 A1 | 9/2001 | Alriksson et al. |
| 2001/0039585 A1 | 11/2001 | Primak et al. |
| 2002/0049901 A1 | 4/2002 | Carvey |
| 2002/0051427 A1 | 5/2002 | Carvey |
| 2002/0087723 A1 | 7/2002 | Williams et al. |
| 2002/0133494 A1 | 9/2002 | Goedken |
| 2002/0133534 A1* | 9/2002 | Forslow .................. 709/200 |
| 2002/0141346 A1 | 10/2002 | Garcia-Luna-Aceves et al. |
| 2002/0181507 A1 | 12/2002 | Jones |
| 2003/0086410 A1 | 5/2003 | Eikkula |
| 2003/0095536 A1 | 5/2003 | Hu et al. |
| 2003/0115358 A1 | 6/2003 | Yun |
| 2004/0037278 A1 | 2/2004 | Wong et al. |
| 2004/0042485 A1 | 3/2004 | Gettala et al. |
| 2004/0088424 A1 | 5/2004 | Park et al. |
| 2004/0098612 A1* | 5/2004 | Lee et al. ................ 713/200 |
| 2004/0114744 A1 | 6/2004 | Trossen |
| 2004/0158606 A1 | 8/2004 | Tsai |
| 2004/0205190 A1 | 10/2004 | Chong et al. |
| 2004/0221061 A1 | 11/2004 | Chavez |
| 2005/0002417 A1 | 1/2005 | Kelly et al. |
| 2005/0099964 A1 | 5/2005 | Delaney et al. |
| 2005/0207402 A1 | 9/2005 | Kobayashi et al. |
| 2005/0227685 A1 | 10/2005 | Costa Requena et al. |
| 2005/0232236 A1 | 10/2005 | Allison et al. |
| 2005/0232407 A1 | 10/2005 | Craig et al. |
| 2005/0235065 A1 | 10/2005 | Le et al. |
| 2005/0246545 A1 | 11/2005 | Reiner |
| 2005/0246716 A1 | 11/2005 | Smith et al. |
| 2006/0010321 A1 | 1/2006 | Nakamura et al. |
| 2006/0045249 A1 | 3/2006 | Li et al. |
| 2006/0069776 A1 | 3/2006 | Shim et al. |
| 2006/0077926 A1 | 4/2006 | Rune |
| 2006/0101143 A1 | 5/2006 | Garcia et al. |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0172730 A1 | 8/2006 | Matsuda |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0253563 A1 | 11/2006 | Yang et al. |
| 2006/0274744 A1 | 12/2006 | Nagai et al. |
| 2007/0047539 A1 | 3/2007 | Agarwal et al. |
| 2007/0153995 A1 | 7/2007 | Fang et al. |
| 2007/0156909 A1 | 7/2007 | Osborn et al. |
| 2007/0168421 A1 | 7/2007 | Kalyanpur et al. |
| 2007/0191004 A1 | 8/2007 | Yamakawa et al. |
| 2007/0214209 A1 | 9/2007 | Maeda |
| 2007/0280447 A1* | 12/2007 | Cai et al. .................. 379/114.03 |
| 2007/0297419 A1 | 12/2007 | Asherup et al. |
| 2008/0025230 A1 | 1/2008 | Patel et al. |
| 2008/0039104 A1 | 2/2008 | Gu et al. |
| 2008/0144602 A1 | 6/2008 | Casey |
| 2008/0167035 A1 | 7/2008 | Buckley et al. |
| 2008/0280623 A1 | 11/2008 | Danne et al. |
| 2008/0301162 A1 | 12/2008 | Wall et al. |
| 2008/0317247 A1 | 12/2008 | Jeong et al. |
| 2009/0080440 A1 | 3/2009 | Balyan et al. |
| 2009/0129271 A1 | 5/2009 | Ramankutty et al. |
| 2009/0138619 A1 | 5/2009 | Schnizlein et al. |
| 2009/0185494 A1 | 7/2009 | Li et al. |
| 2009/0193071 A1 | 7/2009 | Qiu et al. |
| 2009/0232011 A1 | 9/2009 | Li et al. |
| 2009/0268723 A1 | 10/2009 | Przybysz |
| 2010/0042525 A1 | 2/2010 | Cai et al. |
| 2010/0135287 A1 | 6/2010 | Hosain et al. |
| 2010/0265948 A1 | 10/2010 | Patel et al. |
| 2010/0299451 A1* | 11/2010 | Yigang et al. ................. 709/241 |
| 2011/0060830 A1 | 3/2011 | Kang et al. |
| 2011/0116378 A1 | 5/2011 | Ramankutty et al. |
| 2011/0116382 A1 | 5/2011 | McCann et al. |
| 2011/0188397 A1 | 8/2011 | McCann et al. |
| 2011/0199906 A1 | 8/2011 | Kanode et al. |
| 2011/0200047 A1 | 8/2011 | McCann et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1 | 8/2011 | Craig et al. |
| 2011/0202614 A1 | 8/2011 | Craig et al. |
| 2011/0202676 A1 | 8/2011 | Craig et al. |
| 2011/0202677 A1 | 8/2011 | Craig et al. |
| 2011/0202684 A1 | 8/2011 | Craig et al. |
| 2011/0225280 A1 | 9/2011 | Delsesto et al. |
| 2011/0225306 A1 | 9/2011 | Delsesto et al. |
| 2011/0302244 A1 | 12/2011 | McCann et al. |
| 2011/0314178 A1 | 12/2011 | Kanode et al. |
| 2012/0036246 A1 | 2/2012 | Marsico |
| 2012/0155389 A1 | 6/2012 | McNamee et al. |
| 2012/0224524 A1 | 9/2012 | Marsico |

FOREIGN PATENT DOCUMENTS

| | | |
|---|---|---|
| CN | ZL 200780036907.1 | 2/2012 |
| EP | 1 134 939 A1 | 9/2001 |
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| JP | 2006-279805 A | 10/2006 |
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 2008/019056 A2 | 2/2008 |
| WO | WO 2008/087633 A2 | 7/2008 |
| WO | WO 2009/018418 A2 | 2/2009 |
| WO | WO 2009/058067 A1 | 5/2009 |
| WO | WO 2009/070179 A1 | 6/2009 |

| | | |
|---|---|---|
| WO | WO 2009/134265 A1 | 11/2009 |
| WO | WO 2011/047382 A2 | 4/2011 |
| WO | WO 2011/100587 A2 | 8/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100626 A2 | 8/2011 |
| WO | WO 2011/100630 A2 | 8/2011 |
| WO | WO 2012/119147 A1 | 9/2012 |

OTHER PUBLICATIONS

Notification of Transmittal of the International Search Report and the Written Opinion of the International Searching Authority, or the Declaration for International Application No. PCT/US2010/053062 (Jun. 28, 2011).

Znaty, "Diameter, GPRS, (LTE + ePC = EPS), IMS, PCC and SDM," EFORT, pp. 1-460 (May 2010).

"Ericsson Unified Number Portability," (Downloaded from the Internet on Jan. 24, 2011).

"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).

"Traffix Diameter Gateway; Instant Diameter Connection to any Network Element," Traffix Systems, pp. 1-4 (Publication Date Unknown) (Downloaded from the Internet on Feb. 8, 2010).

"Traffix Diameter Load Balancer; Scaling the Diameter Control Plane," Traffix Systems, pp. 1-4 (Publication Date Unknown) (Downloaded from the Internet on Feb. 8, 2010).

"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).

"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).

"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).

"Mapping Diameter Interfaces to Functionality in 3GPP/3GPP2 IMS Architecture," Whitepaper by Traffix Systems, pp. 1-10 (Copyright 2010).

Jones et al., "Diameter Extended NAPTR," Individual Submission Internet-Draft, draft-ietf-dime-extended-naptr-00, pp. 1-9 (Dec. 29, 2009).

Korhonen et al., "Clarifications on the Routing of Diameter Requests Based on the Username and the Realm," RFC 5729, pp. 1-9 (Dec. 2009).

3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).

3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).

3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).

3GPP, "3rd Generation Partnership Project; Technical Specification Group Core Network and Terminals; IP Multimedia (IM) Subsystem Sh Interface; Signalling Flows and Message Contents (Release 9)," 3GPP TS 29.328 V9.0.0 (Dec. 2009).

3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).

3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).

3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).

3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).

3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).

3GPP, "3rd Generation Partnership Project; Technical Specification Group Services and System Aspects; Policy and Charging Control Architecture (Release 9)," 3GPP TS 23.203 V9.3.0 (Dec. 2009).

Jiao et al., "The Diameter Capabilities Update Application," Network Working Group Internet-Draft draft-ietf-dime-capabilities-update-01, pp. 1-8 (Dec. 1, 2009).

Tsou et al., "Realm-Based Redirection in Diameter," Internet Engineering Task Force, draft-ietf-dime-realm-based-redirect-02, pp. 1-7 (Oct. 27, 2009).

Huang et al., "The Diameter Precongestion Notification (PCN) Data Collection Applications," Network Working Group Internet-Draft <draft-huang-dime-pcn-collection-02>, pp. 1-19 (Oct. 26, 2009).

Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).

Korhonen et al., "Diameter User-Name and Realm Based Request Routing Clarifications," Diameter Maintenance and Extensions (DIME) Internet-Draft, draft-ietf-dime-nai-routing-04.txt, pp. 1-13, (Oct. 6, 2009).

Fajardo et al., "Diameter Base Protocol," DIME Internet-Draft, draft-ietf-dime-rfc3588bis-19.txt, pp. 1-160 (Sep. 2, 2009).

3GPP, "3rd Generation Partnership Project; Technical Specification Group core Network and Terminals; Generic Authentication Architecture (GAA); Zh and Zn Interfaces Based on the Diameter Protocol; Stage 3 (Release 8)," 3GPP TS 29.109 V8.3.0 (Sep. 2009).

3GPP, "3rd Generation Partnership Project; Technical Specification Group Core Network and Terminals; Numbering, Addressing and Identification (Release 8)," 3GPP TS 23.003 V8.6.0 (Sep. 2009).

Jones et al., "Diameter Extended NAPTR," Internet-Draft, draft-jones-dime-extended-naptr-00, pp. 1-8 (Aug. 23, 2009).

Korhonen et al., "Diameter User-Name and Realm Based Request Routing Clarificatons," Internet-Draft, draft-ietf-dime-nai-routing-03.txt, pp. 1-11 (Aug. 19, 2009).

Tsou et al., "Session-Spectific Explicit Diameter Request Routing," Network Working Group Internet-Draft, draft-tsou-diameter-explicit-routing-03, pp. 1-18 (Aug. 5, 2009).

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).

Bhardwaj, "Roaming Hubbing & LTE," GSMA London, pp. 1-11 (May 19, 2009).

3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).

3GPP, "3rd Generation Partnership Project; Technical Specification Group Services and System Aspects; Telecommunication Management; Charging Management; Charging Data Description for the IP Multimedia Subsystem (IMS) (Release 5)," 3GPP TS 32.225 V5.11.0 (Mar. 2006).

Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).

Aboba et al., "The Network Access Identifier," Network Working Group, RFC 4282, pp. 1-17 (Dec. 2005).

3GPP, "3rd Generation Partnership Project; Technical Specification Group Core Network and Terminals; Policy Control Over Go Interface (Release 6),"3GPP TS 29.207 V6.5.0 (Sep. 2005).

Eronen et al., "Diameter Extensible Authentication Protocol (EAP) Application," Network Working Group, RFC 4072, pp. 1-31 (Aug. 2005).

Hakala et al., "Diameter Credit-Control Application," Network Working Group RFC 4006, pp. 1-107 (Aug. 2005).

Calhoun et al., "Diameter Mobile IPv4 Application," Network Working Group, RFC 4004, pp. 1-50 (Aug. 2005).

3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).

Calhoun et al., "Diameter Base Protocol," Network Working Group, RFC 3588, pp. 1-148 (Sep. 2003).

Aboba et al., "Authentication, Authorization and Accounting (AAA) Transport Profile," Network Working Group, RFC 3539, pp. 1-39 (Jun. 2003).

Stewart at al., "Stream Control Transmission Protocol," Network Working Group RFC 2960, pp. 1-134 (Oct. 2000).

Greene et al., "Bi-Directional Session Setup Extension to Diameter," Internet Draft <draft-greene-diameter-ss7-session-00.txt>, pbs. 1-12 (Jul. 1998).

Handley et al., "SDP: Session Description Protocol," IETF RFC 2327, pp. 1-42 (Apr. 1998).

"Diameter Overview," referenced from www.ulticom.com/html/products/signalware-diameter-reference-guide.asp (Publication Date Unknown).

Final Official Action for U.S. Appl. No. 12/906,816 (Feb. 21, 2012).

Applicant-Initiated Interview Summary for U.S. Appl. No. 12/906,816 (Jan. 27, 2012).

Notification of Transmittal of the International Search Report and the Written Opinion of the International Searching Authority, or the Declaration for International Application No. PCT/US2011/024622 (Oct. 31, 2011).

Notification of Transmittal of the International Search Report and the Written Opinion of the International Searching Authority, or the Declaration for International Application No. PCT/US2011/024617 (Oct. 31, 2011).

Notification of Transmittal of the International Search Report and the Written Opinion of the International Searching Authority, or the Declaration for International Application No. PCT/US2011/024614 (Oct. 31, 2011).

Notification of Transmittal of the International Search Report and the Written Opinion of the International Searching Authority, or the Declaration for International Application No. PCT/US2011/024646 (Oct. 28, 2011).

Notification of Transmittal of the International Search Report and the Written Opinion of the International Searching Authority, or the Declaration for International Application No. PCT/US2011/024645 (Oct. 28, 2011).

Notification of Transmittal of the International Search Report and the Written Opinion of the International Searching Authority, or the Declaration for International Application No. PCT/US2011/024642 (Oct. 28, 2011).

Notification of Transmittal of the International Search Report and the Written Opinion of the International Searching Authority, or the Declaration for International Application No. PCT/US2011/024621 (Oct. 28, 2011).

Notification of Transmittal of the International Search Report and the Written Opinion of the International Searching Authority, or the Declaration for International Application No. PCT/US2011/024637 (Oct. 27, 2011).

Notification of Transmittal of the International Search Report and the Written Opinion of the International Searching Authority, or the Declaration for International Application No. PCT/US2011/024629 (Oct. 27, 2011).

Notification of Transmittal of the International Search Report and the Written Opinion of the International Searching Authority, or the Declaration for International Application No. PCT/US2011/0024625 (Oct. 25, 2011).

Notification of Transmittal of the International Search Report and the Written Opinion of the International Searching Authority, or the Declaration for International Application No. PCT/US2011/024611 (Oct. 20, 2011).

Notification of Transmittal of the International Search Report and the Written Opinion of the International Searching Authority, or the Declaration for International Application No. PCT/US2011/024601 (Oct. 20, 2011).

Notification of Transmittal of the International Search Report and the Written Opinion of the International Searching Authority, or the Declaration for International Application No. PCT/US2011/024588 (Oct. 20, 2011).

Non-Final Official Action for U.S. Appl. No. 12/906,816 (Oct. 5, 2011).

Jones et al., "Diameter Command Code Registration for the Third Generation Partnership Project (3GPP) Evolved Packet System (EPS)," Network Working Group, RFC 5516, pp. 1-5 (Apr. 2009).

Advisory Action for U.S. Appl. No. 12/906,816 (Jun. 5, 2012).

Non-Final Official Action for U.S. Appl. No. 13/026,076 (Jun. 4, 2012).

Applicant-Initiated Interview Summary for U.S. Appl. No. 12/906,816 (May 17, 2012).

Non-Final Official Action for U.S. Appl. No. 13/026,105 (May 16, 2012).

Notice of Allowance and Fee(s) Due for U.S. Appl. No. 13/026,162 (Apr. 1, 2013).

Supplemental Notice of Allowability for U.S. Appl. No. 13/026,031 (Mar. 22, 2013).

Notice of Allowance and Fee(s) Due for U.S. Appl. No. 13/026,098 (Mar. 11, 2013).

Interview Summary for U.S. Appl. No. 13/026,144 (Mar. 4, 2013).

Supplemental Notice of Allowability for U.S. Appl. No. 13/026,162 (Feb. 27, 2013).

Notice of Allowance and Fee(s) Due for U.S. Appl. No. 13/025,968 (Feb. 27, 2013).

Supplemental Notice of Allowability for U.S. Appl. No. 13/026,162 (Feb. 7, 2013).

Notice of Allowance and Fee(s) Due for U.S. Appl. No. 13/026,031 (Jan. 30, 2013).

Supplemental Notice of Allowability for U.S. Appl. No. 13/026,162 (Jan. 24, 2013).

Notice of Allowance and Fee(s) Due for U.S. Appl. No. 13/026,162 (Dec. 19, 2012).

Final Official Action for U.S. Appl. No. 13/026,076 (Dec. 7, 2012).

Final Official Action for U.S. Appl. No. 13/026,105 (Nov. 26, 2012).

Communication of European Publication Number and Information on the Application of Article 67(3) EPC for European Patent Application No. 11742923.3 (Nov. 21, 2012).

Communication of European Publication Number and Information on the Application of Article 67(3) EPC for European Patent Application No. 11742912.6 (Nov. 21, 2012).

Communication of European Publication Number and Information on the Application of Article 67(3) EPC for European Patent Application No. 11742909.2 (Nov. 21, 2012).

Communication of European Publication Number and Information on the Application of Article 67(3) EPC for European Patent Application No. 11742906.8 (Nov. 21, 2012).

Communication of European Publication Number and Information on the Application of Article 67(3) EPC for European Patent Application No. 11742905.0 (Nov. 21, 2012).

Communication of European Publication Number and Information on the Application of Article 67(3) EPC for European Patent Application No. 11742901.9 (Nov. 21, 2012).

Communication of European Publication Number and Information on the Application of Article 67(3) EPC for European Patent Application No. 11742894.6 (Nov. 21, 2012).

Non-Final Official Action for U.S. Appl. No. 13/412,352 (Oct. 26, 2012).

Non-Final Official Action for U.S. Appl. No. 13/026,144 (Oct. 16, 2012).

Non-Final Official Action for U.S. Appl. No. 13/026,098 (Sep. 20, 2012).

Non-Final Official Action for U.S. Appl. No. 13/026,060 (Sep. 19, 2012).

Communication of European Publication Number and Information on the Application of Article 67(3) EPC for European Patent Application No. 11742921.7 (Sep. 12, 2012).

Non-Final Official Action for U.S. Appl. No. 13/026,081 (Sep. 12, 2012).

Non-Final Official Action for U.S. Appl. No. 13/026,112 (Aug. 29, 2012).

Communication of European publication number and information on the application of Article 67(3) EPC for European Application No. 10824243.9 (Jul. 25, 2012).

Notification of Transmittal of the International Search Report and the Written Opinion of the International Searching Authority, or the Delcaration for International Patent Application No. PCT/US2012/027736 (Jun. 12, 2012).

Traffix Systems, "Datasheet; Traffix Signaling Delivery Controller (SDC)," pp. 1-5 (May 2011).

First Office Action for Chinese Patent Application No. 200820109633.9 (May 3, 2012).

Notice of Allowance for U.S. Appl. No. 11/510,284 (Dec. 9, 2010).

Chinese Office Action for Chinese Patent Application No. 200780036907.1 (Oct. 11, 2010).

Final Official Action for U.S. Appl. No. 11/510,284 (Jun. 22, 2010).

Official Action for U.S. Appl. No. 11/510,284 (Feb. 23, 2010).

Notice of Allowance and Fee(s) Due for U.S. Appl. No. 12/183,406 (Feb. 12, 2010).

Final Official Action for U.S. Appl. No. 11/510,284 (Jul. 9, 2009).

Notification of Transmittal of the International Search Report and the Written Opinion of the International Searching Authority, or the Declaration for International Application No. PCT/US2008/071718 (Jan. 28, 2009).

Official Action for U.S. Appl. No. 11/510,284 (Dec. 24, 2008).

Notification of Transmittal of the International Search Report and the Written Opinion of the International Searching Authority, or the Declaration for International Application No. PCT/US07/17329 (Feb. 15, 2008).

A. B. Roach, "Session Initiation Protocol (SIP)—Specific Event Notification," dynamicsoft, Network Working Group, pp. 1-38 (Jun. 2002).

Rosenberg, "SIP Proxies," www.dynamicsoft.com, pp. 1-30 (Jul. 2000).

Wiesmann et al., "Understanding Replication in Databases and Distributed Systems," IEEE, pp. 464-474 (Apr. 10, 2000).

Wang et al., "A Signaling System Using Lightweight Call Sessions," IEEE, pp. 697-706 (Mar. 26, 2000).

Gribble et al., "The MultiSpace: an Evolutionary Platform for Infrastructural Services," The University of California at Berkeley, pp. 157-170 (Jun. 6, 1999).

Handley et al., "SIP: Session Initiation Protocol," IETF RFC 2543, pp. 1-153 (Mar. 1999).

Handley et al., "SIP: Session Description Protocol," IETF RFC 2327, pp. 1-42 (Apr. 1998).

S. Paul et al., "Reliable Multicast Transport Protocol (RMTP)," IEEE Journal on Selected Areas in Communications, vol. 15, No. 3, pp. 407-421 (Apr. 1997).

Lin et al., "A Reliable Multicast Transport Protocol," IEEE INFOCOM, pp. 1414-1424 (1996).

* cited by examiner

METHODS, SYSTEMS, AND COMPUTER READABLE MEDIA FOR DIAMETER NETWORK MANAGEMENT

PRIORITY CLAIM

This application claims the benefit of U.S. Provisional Patent Application Ser. No. 61/304,310 filed Feb. 12, 2010; the disclosure of which is incorporated herein by reference in its entirety.

STATEMENT OF INCORPORATION BY REFERENCE

The disclosures of each of the following commonly-owned, co-pending U.S. Patent Applications filed on Feb. 11, 2011 are hereby incorporated herein by reference in their entireties:

"Methods, Systems, And Computer Readable Media for Inter-Diameter-Message Processor Routing," (Ser. No. 13/025,968);

"Methods, Systems, And Computer Readable Media For Source Peer Capacity-Based Diameter Load Sharing" (Ser. No. 13/026,031);

"Methods, Systems, And Computer Readable Media For Inter-Message Processor Status Sharing," (Ser. No. 13/026,105);

"Methods, Systems, And Computer Readable Media For Providing Priority Routing At A Diameter Node," (Ser. No. 13/026,060);

"Methods, Systems, And Computer Readable Media For Providing Peer Routing At A Diameter Node," (Ser. No. 13/026,076);

"Methods, Systems, And Computer Readable Media For Providing Origin Routing At A Diameter Node," (Ser. No. 13/026,081);

"Methods, Systems, And Computer Readable Media For Providing Local Application Routing At A Diameter Node," (Ser. No. 13/026,098);

"Methods, Systems, And Computer Readable Media For Answer-Based Routing Of Diameter Request Messages," (Ser. No. 13/026,112);

"Methods, Systems, And Computer Readable Media For Performing Diameter Answer Message-Based Network Management At A Diameter Signaling Router (DSR)," (Ser. No. 13/026,125);

"Methods, Systems, And Computer Readable Media For Multi-Interface Monitoring And Correlation Of Diameter Signaling Information," (Ser. No. 13/026,133);

"Methods, Systems, And Computer Readable Media For Diameter Protocol Harmonization," (Ser. No. 13/026,144); and "Methods, Systems, And Computer Readable Media For Diameter Application Loop Prevention," (Ser. No. 13/026,162)

TECHNICAL FIELD

The subject matter described herein relates to methods, systems, and computer readable media for communications in a communications network. More particularly, the subject matter described herein relates to methods, systems, and computer readable media for Diameter network management.

BACKGROUND

Diameter is an authentication, authorization and accounting (AAA) protocol for computer networks and is a successor to Radius. The Diameter base protocol is defined in IETF RFC 3588, which is incorporated by reference herein in its entirety. Diameter messages use a per user framework and exist in the format of request-answer messages. Diameter answer messages travel back to the request source via the same path through which the request message was routed using hop-by-hop transport.

Congestion and other communication issues (e.g., link failure) can prevent or hinder Diameter messages from reaching an appropriate destination. If a Diameter request message or a corresponding answer message is lost or undelivered, problems can arise. For example, Diameter messages may be used to authenticate subscribers for service access. If subscribers are not authenticated, the subscribers may be denied service access. Hence, to reduce problems associated with Diameter message delivery, it is important that Diameter nodes are made aware of network management information, such as node availability information, path availability information, and congestion information.

Accordingly, there exists a need for methods, systems, and computer readable media for Diameter network management.

SUMMARY

According to one aspect, the subject matter described herein includes a method for providing Diameter network management information in a communications network. The method includes steps occurring at a Diameter signaling router (DSR). The method also includes determining whether successful Diameter communications are available with a first Diameter application. The method further includes in response to determining that successful Diameter communications are not available with the first Diameter application, generating a first Diameter network management message (DNMM) indicating that successful Diameter communications are not available with the first Diameter application. The method also includes sending the first DNMM to a second Diameter node.

According to another aspect, the subject matter described herein includes a system for providing Diameter network management information in a communications network. The system includes a Diameter signaling router (DSR). The DSR includes a Diameter communications interface. The system also includes a network management module for determining whether successful Diameter communications are available with a first Diameter application, for, in response to determining whether successful Diameter communications are not available with the first Diameter application, generating a first Diameter network management message (DNMM) indicating that successful Diameter communications are not available with the first Diameter application, and for sending the first DNMM to a second Diameter node.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware (such as a processor) and/or firmware for implementing features described herein.

As used herein, the term "Diameter application" refer to software in combination with hardware (such as a processor) and/or firmware for implementing or using a Diameter protocol. For example, a Diameter application may be software executed by a processor for performing home subscriber server (HSS) functions, such as subscriber authentication.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1A:
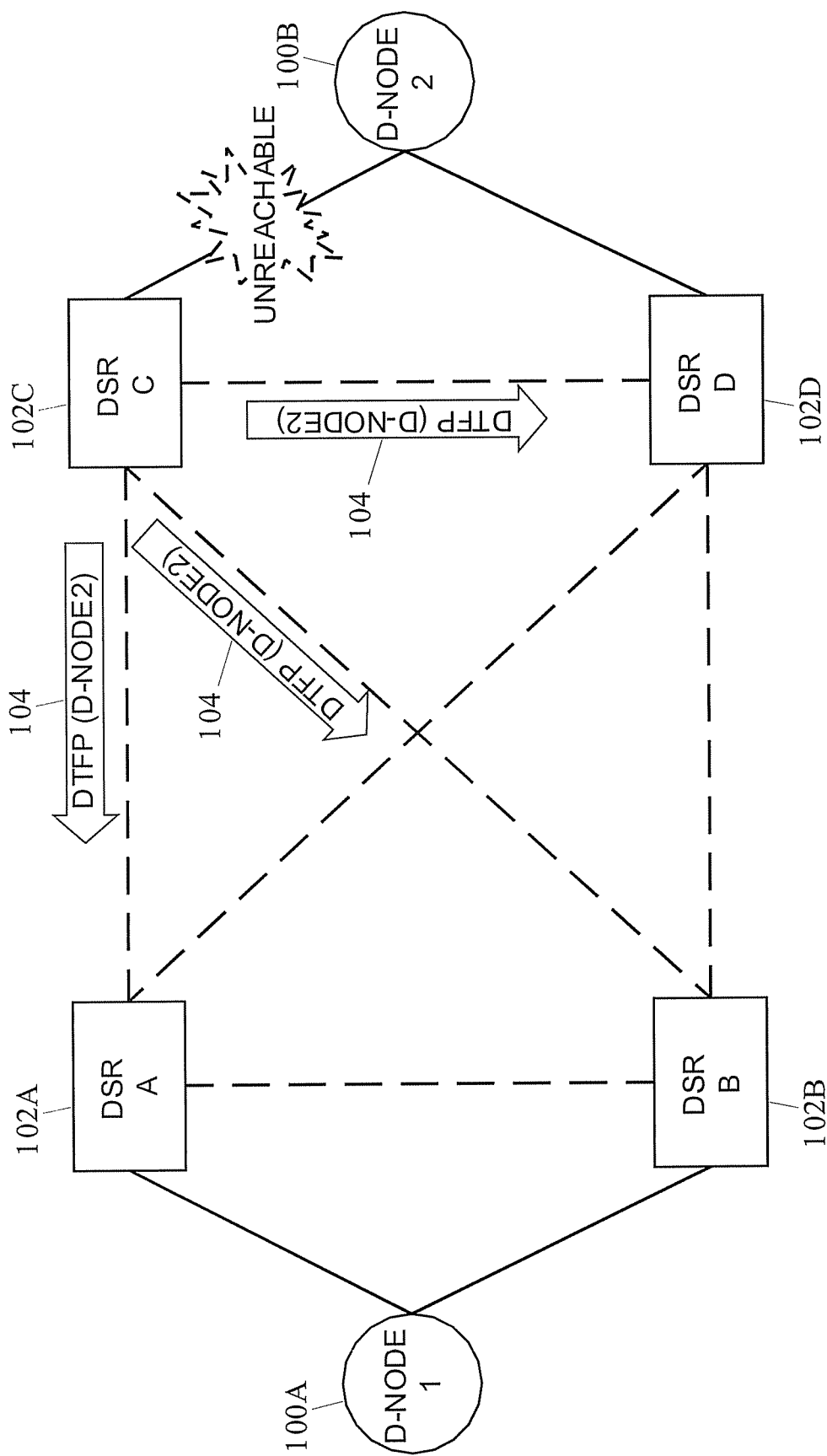
FIG. 1A is a network diagram illustrating a DSR in a communications network providing Diameter network management information indicating a Diameter node is unreachable according to an embodiment of the subject matter described herein.
Figure 1B:
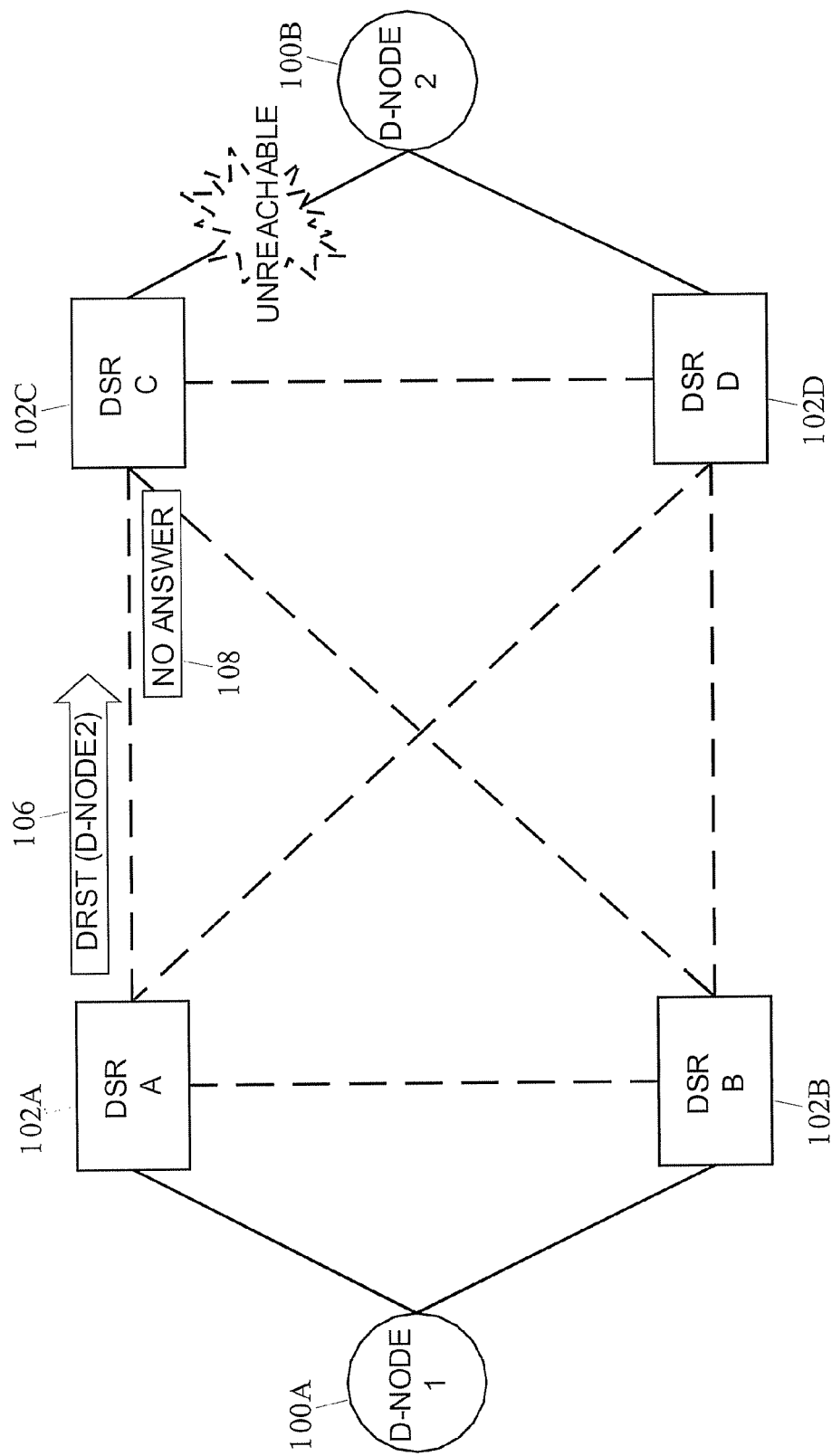
FIG. 1B is a network diagram illustrating a DSR in the communications network requesting Diameter network management information for a Diameter node according to an embodiment of the subject matter described herein.
Figure 1C:
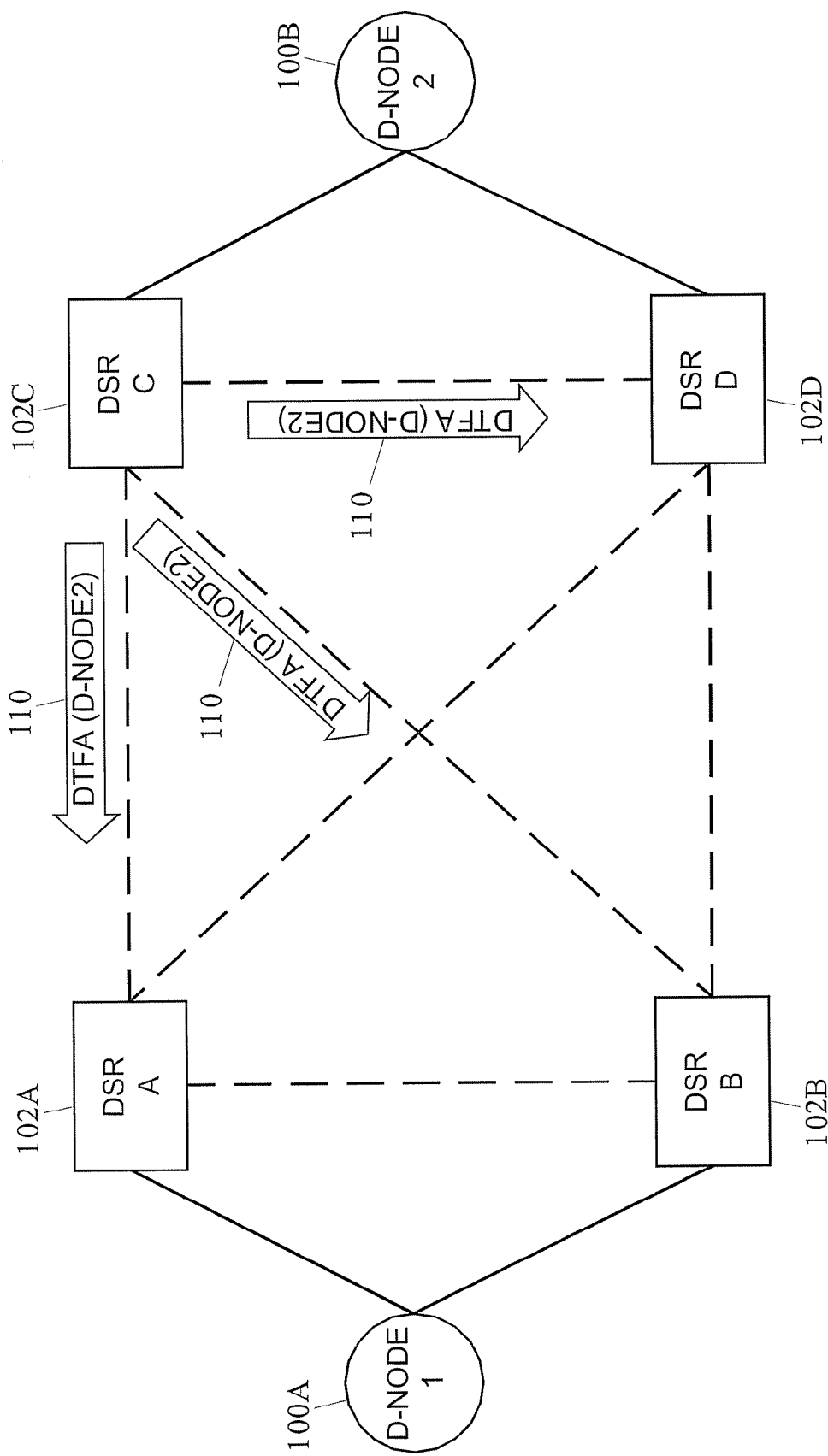
FIG. 1C is a network diagram illustrating a DSR in the communications network providing Diameter network management information indicating a Diameter node is reachable according to an embodiment of the subject matter described herein.

FIGS. 1A-1C are network diagrams illustrating examples of Diameter network management in an exemplary communications network according to embodiments of the subject matter described herein.

In the embodiments illustrated in FIGS. 1A-1C, the exemplary communications network may include Diameter signaling routers (DSRs) 102A-D and Diameter nodes 100A-B. DSRs 102A-D may be any suitable entities for routing or relaying Diameter signaling messages between Diameter nodes. For example, a DSR 102 may be a Long Term Evolution (LTE) signaling router, an LTE Diameter signaling router, a Diameter signaling agent, a Diameter proxy agent, a Diameter relay agent, a Diameter routing agent, a Diameter translation agent, or a Diameter redirect agent. DSR 102 may include functionality for processing various messages. In one embodiment, DSR functionality, including the network management functionality described herein, may be implemented by one or more modules (e.g., a network management module and a routing module).

Diameter nodes 100A-B may be nodes capable of implementing or using a Diameter protocol. For example, Diameter nodes 100A-B may each be a mobility management entity (MME), a home subscriber server (HSS) and/or authentication, authorization, and accounting (AAA) server, a Bearer Binding and Event Reporting Function (BBERF), a policy and charging enforcement function (PCEF), a policy and charging rules function (PCRF), a subscriber profile repository (SPR), a serving gateway (SGW), a packet data network gateway (PDN GW), a Diameter peer node, a Diameter agent, a network node, a policy engine, a policy server, an application function (AF), an application server, a Diameter signaling agent, a LTE node, an Internet protocol (IP) multimedia subsystem (IMS) network node, a Diameter message processor, a server, a node, a database, a computing platform, or a DSR 102.

DSRs 102A-D may include one or more processors for performing various functions, e.g., a plurality of message processors. In one embodiment, DSRs 102A-D may include one or more processors for communicating with various Diameter nodes 100A-B via one or more 3rd Generation Partnership Project (3GPP) LTE communications interfaces. For example, a DSR 102 may communicate messages between an MME and an HSS via one or more LTE S6 interfaces. In a second example, a DSR 102 may exchange or communicate messages between an SPR via one or more LTE Sp interfaces.

In another embodiment, DSRs 102A-D may include one or more processors for communicating with Diameter nodes 100A-B via one or more other (e.g., non-LTE) communications interfaces. For example, a DSR 102 may communicate with IP multimedia subsystem (IMS) nodes, such as call session control functions (CSCFs), using IMS-related interfaces. For instance, DSR 102 may receive Diameter messages from a CSCF via a Cx Diameter interface.

Referring to the embodiment illustrated in FIG. 1A, DSR 102C may determine and provide Diameter network management information indicating a Diameter node is unreachable. In one embodiment, DSR 102C may provide Diameter network management information dynamically and/or in response to a Diameter message. For example, DSR 102C may provide Diameter network management information in response to network conditions occurring, such as detection of a Diameter connection failure or congestion. In another example, DSR 102C may provide Diameter network management information in response to receiving a Diameter network management message (DNMM) or a Diameter request message.

In one embodiment, DSR 102C may determine that a Diameter message cannot be communicated to Diameter node 100B via DSR 102C. For example, DSR 102C may attempt to relay a Diameter request message to an application or subsystem associated with Diameter node 100B. Using response timers and/or other methods (e.g., timers, heartbeat packets and/or link probes), DSR 102C may detect or determine that Diameter node 100B is currently unreachable.

In general, a DSR 102 according to an embodiment of the subject matter described herein, such as DSR 102C, may determine whether successful Diameter communications are available with a Diameter application and/or another Diameter node. Determining whether successful Diameter communications are available with a Diameter application and/or another Diameter node may include determining whether the Diameter node is unreachable due to a link failure, a Diameter connection failure, a Diameter protocol error, congestion, or any other cause which may be indicate the unavailability of Diameter level communications with a node.

In some embodiments, in response to determining whether successful Diameter communications are available with a Diameter application and/or another Diameter node, DSR 102 may use this information in generating DNMMs or other Diameter network management information. DSR 102 may communicate the Diameter network management information to various destinations, e.g., other Diameter nodes (e.g., peer DSR 102) in the communications network and/or internal Diameter message processors associated with DSR 102.

In the example illustrated in FIG. 1A, in response to determining that Diameter node 100B is currently unreachable, DSR 102C may generate a DNMM. The DNMM may include information indicating that Diameter node 100B is unreachable via DSR 102C. For example, DSR 102C may generate a Diameter transfer prohibited (DTFP) message 104 indicating that a Diameter message cannot be communicated to Diameter node 100B via DSR 102C. In another embodiment, DSR 102C may generate DTFP message 104 in response to receiving a Diameter request message (e.g., a DRST message) inquiring about a Diameter node that is currently unavailable.

DSR 102C may send or initiate sending the DNMM or copies of the DNMM to one or more nodes, e.g., Diameter nodes 100A-B or DSRs 102A-D. In one embodiment, a peer DSR 102A may receive the DNMM. In response to receiving the DNMM, peer DSR 102A may determine a different path for sending Diameter messages towards Diameter node 100B and may send the Diameter messages to Diameter node 100B via a different path. For example, as illustrated in FIG. 1A, DSR 102C may send DTFP messages 104 to its peer nodes, such as DSR 102A, 102B, and 102D. In response, the peer nodes (e.g., DSRs 102A, 102B, and 102D) may configure Diameter message routing or relaying information so as to steer Diameter message traffic destined for Diameter node 100B away from DSR 102C. For instance, after receiving DTFP message 104, Diameter message traffic destined for Diameter node 100B may be relayed via DSR 102D.

Referring to the embodiment illustrated in FIG. 1B, after receiving a DNMM indicating that Diameter node 100B is unreachable via DSR 102C, DSR 102A may periodically or aperiodically poll DSR 102C with a DNMM requesting information regarding whether DSR 102C is able to reach Diameter node 100B. For example, DSR 102A may generate a Diameter route set test (DRST) message 106 requesting information regarding route availability status for reaching Diameter node 100B via DSR 102C. DSR 102A may send the DNMM towards DSR 102C.

DSR 102C may receive DRST message 106 or another Diameter request message and may indicate route availability status of Diameter node 100B via DSR 102C. In one embodiment, indicating route availability status may include providing no response. For example, as illustrated in FIG. 1B, no answer from DSR 102C (represented by box 108) may indicate that DSR 102C is still unable to reach Diameter node 100B. In another embodiment, indicating route availability status may include providing a response. For example, DSR 102C may respond to DRST message 106 with a message indicating route availability status. For instance, a response message may indicate that DSR 102C is able to reach Diameter node 100B. In another instance, a response message may indicate that DSR 102C is unable to reach Diameter node 100B.

Referring to the embodiment illustrated in FIG. 10, DSR 102C may determine that a Diameter message can be communicated to Diameter node 100B via DSR 102C. For example, a network operator may repair a connection or link failure between Diameter node 100B and DSR 102C. After the repair, using one or more methods (e.g., timers, heartbeat packets and/or link probes), DSR 102C may detect or determine that Diameter node 100B is currently reachable via DSR 102C.

In one embodiment, in response to determining that Diameter node 100B is currently reachable, DSR 102C may generate a DNMM. The DNMM may include information indicating that Diameter node 100B is reachable via DSR 102C. For example, in response to route availability status information changing (e.g., a Diameter node 100 becoming reachable), DSR 102C may generate a Diameter transfer allowed (DTFA) message 110 indicating that a Diameter message can be communicated to Diameter node 100B via DSR 102C. In another embodiment, DSR 102C may generate DTFA message 110 in response to receiving a Diameter request message (e.g., a DRST message). DSR 102C may send or initiate sending DNMMs to one or more nodes.

In one embodiment, peer DSR 102A may receive the DNMM. In response to receiving the DNMM, peer DSR 102A may send Diameter messages to Diameter node 100B via DSR 102C. For example, as illustrated in FIG. 1C, DSR 102C may send DTFA messages 110 to peer nodes, such as DSRs 102A, 102B, and 102D. In response, the peer nodes (e.g., DSRs 102A, 102B, and 102D) may configure Diameter message routing or relaying information so as to steer Diameter message traffic destined for Diameter node 100B to DSR 102C. For example, after receiving DTFA message 110, Diameter message traffic may be steered towards DSR 102C.

Figure 2A:
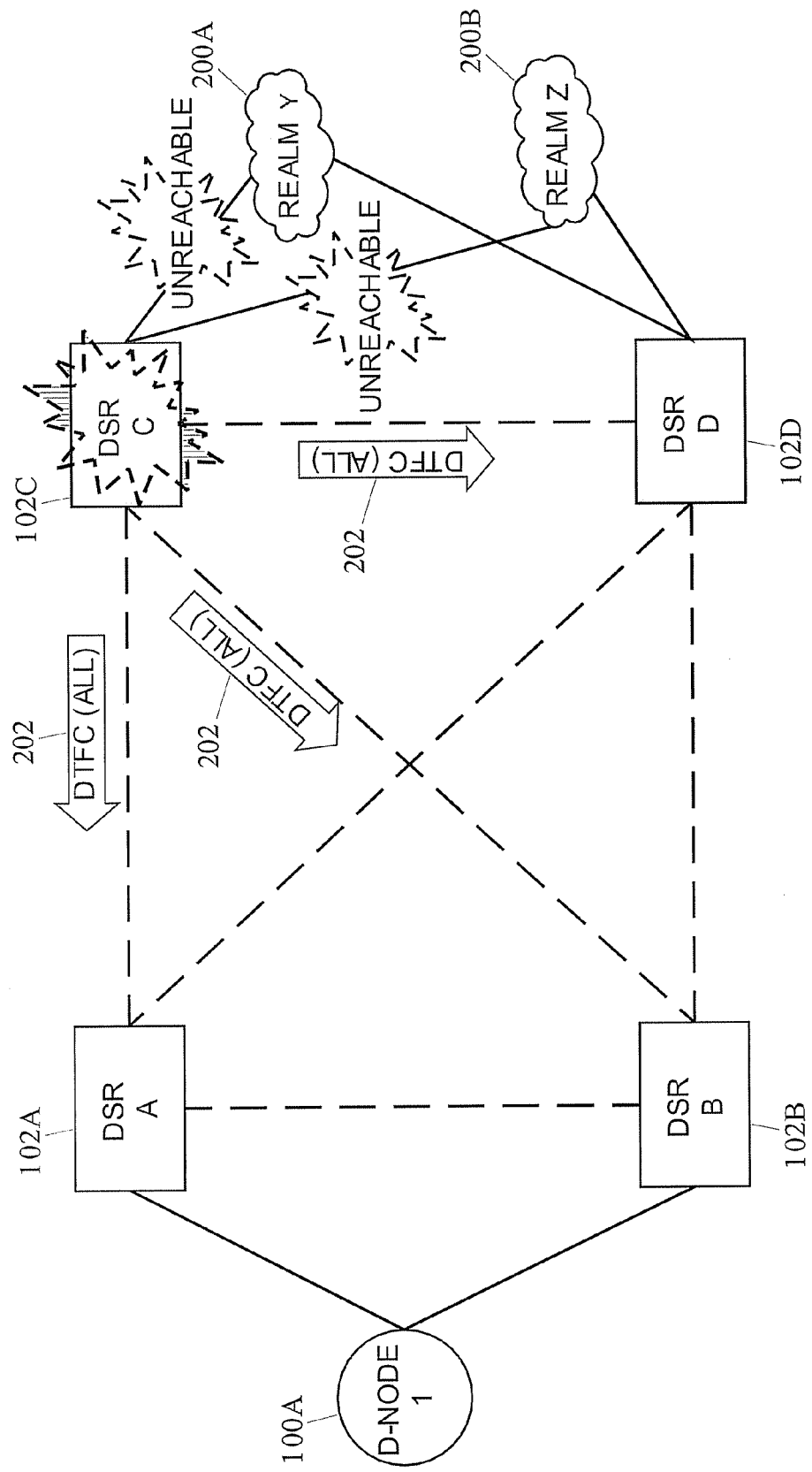
FIG. 2A is a network diagram illustrating a DSR in a communications network providing Diameter network management information indicating all realms are unreachable according to an embodiment of the subject matter described herein.
Figure 2B:
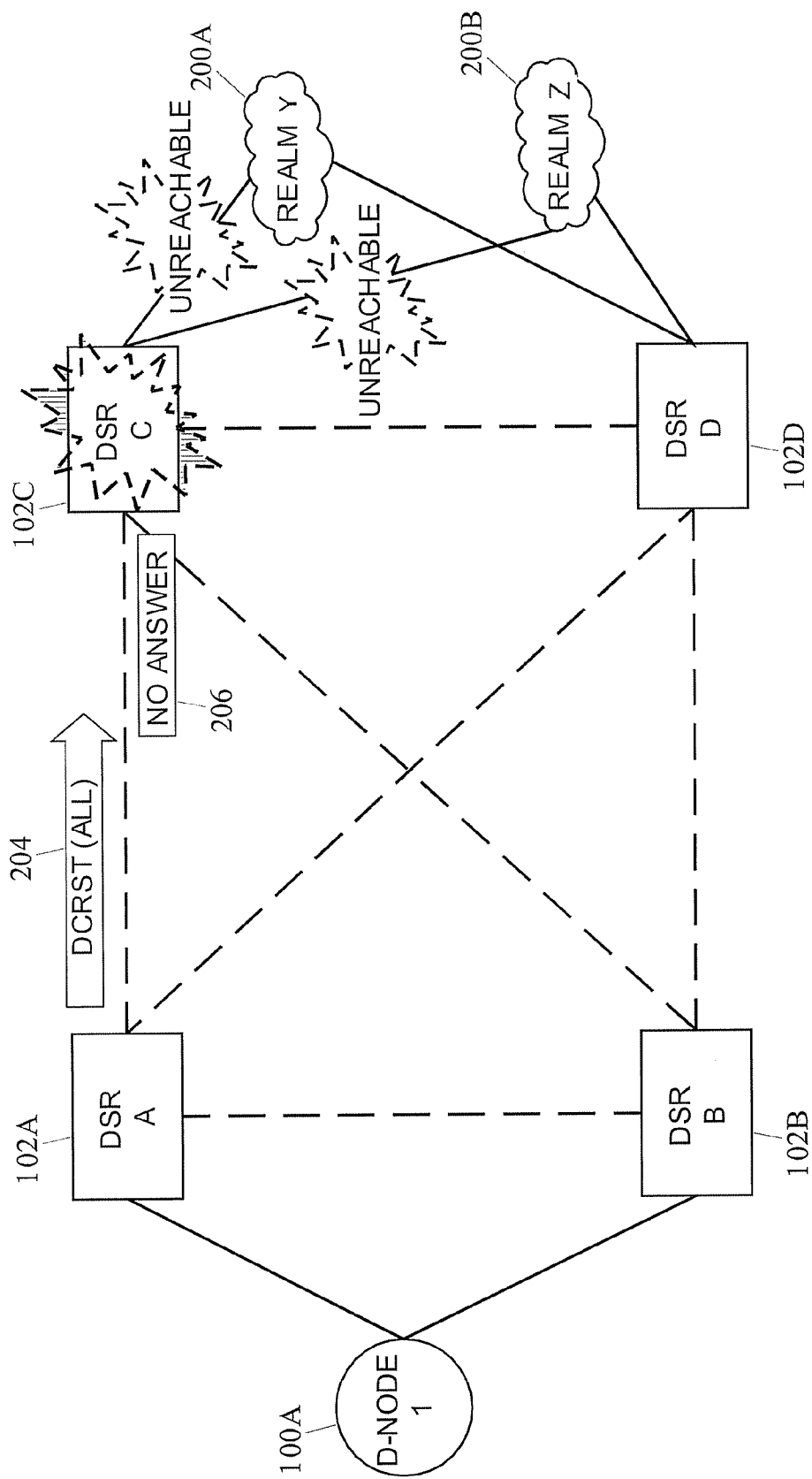
FIG. 2B is a network diagram illustrating a DSR in the communications network requesting Diameter network management information for all realms according to an embodiment of the subject matter described herein.
Figure 2C:
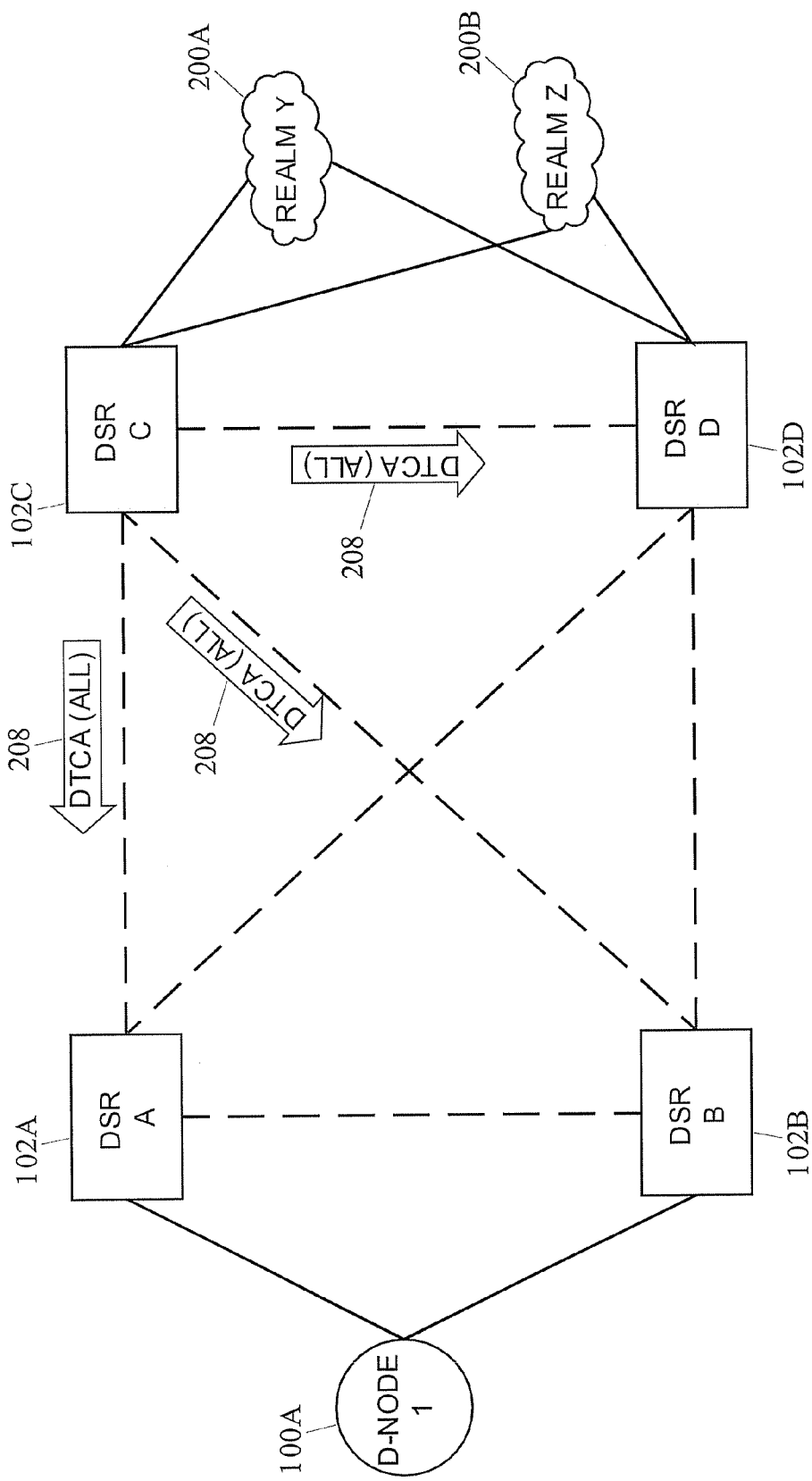
FIG. 2C is a network diagram illustrating a DSR in the communications network providing Diameter network management information indicating all realms are reachable according to an embodiment of the subject matter described herein.

FIGS. 2A-2C are network diagrams illustrating additional examples of Diameter network management in an exemplary communications network according to embodiments of the subject matter described herein. Except as disclosed herein, the exemplary network of FIGS. 2A-2C is essentially the same as the network described in reference to FIGS. 1A-1C.

In the embodiments illustrated in FIGS. 2A-2C, the exemplary network includes realms 200A-B. Realms 200A-B may be entities that include one or more Diameter nodes. In one embodiment, realms 200A-B may include a cluster including Diameter nodes, a network segment including Diameter nodes, a domain including Diameter nodes, a subnet including Diameter nodes, an address space including Diameter nodes, a geographical location including Diameter nodes, a logical location including Diameter nodes, a logical group including Diameter nodes, or a physical group including Diameter nodes.

DSRs 102 may be associated with realms 200A-B. For example, as illustrated in FIG. 2A-2C, links may connect DSR 102C and realms 200A-B and different Diameter connections and/or links may connect DSR 102D and realms 200A-B. Using these connections, DSR 102C and DSR 102D may communicate Diameter messages towards nodes of realms 200A-B.

Referring to the embodiment illustrated in FIG. 2A, DSR 102C may provide Diameter network management information indicating realms 200A-B are unreachable. In one embodiment, DSR 102C may determine that a Diameter message cannot be communicated to realms 200A-B. For example, using one or more methods (e.g., timers, heartbeat packets and/or link probes), DSR 102C may detect or determine that realms 200A-B are currently unreachable via DSR 102C.

In one embodiment, in response to determining that realms 200A-B are currently unreachable, DSR 102C may generate a DNMM. The DNMM may include information indicating that realms 200A-B and/or nodes of realms 200A-B are unreachable via DSR 102C. For example, DSR 102C may generate a Diameter transfer cluster prohibited (DTCP) message 202 indicating that a Diameter message cannot be communicated to realms 200A-B and/or nodes of realms 200A-B via DSR 102C. In another embodiment, DSR 102C may generate DTCP message 202 in response to receiving a Diameter request message (e.g., a Diameter cluster route set test (DCRST) message).

DSR 102C may send or initiate sending DNMMs to one or more nodes. In one embodiment, a peer DSR 102A may receive the DNMM. In response to receiving the DNMM, peer DSR 102A may determine a different path for sending Diameter messages to realm 200A or realm 200B and may send the Diameter messages via a different path. For example, as illustrated in FIG. 2A, DSR 102C may send a DTCP message 202 to peer nodes, such as DSR 102A, 102B, and 102D. In response, the peer nodes (e.g., DSR 102A, 102B, and 102D) may configure Diameter message routing or relaying information so as to steer Diameter message traffic destined for realm 200A or realm 200B generally away from DSR 102C. For instance, after receiving the DTFP message, Diameter message traffic destined for realm 200B may be relayed via DSR 102D.

Referring to the embodiment illustrated in FIG. 2B, after receiving a DNMM indicating that realms 200A-B are unreachable via DSR 102C, DSR 102A may periodically or aperiodically poll DSR 102C with a DNMM requesting information regarding whether DSR 102C is able to reach realms 200A-B. For example, as illustrated in FIG. 1B, DSR 102A may generate a Diameter cluster route set test (DCRST) message 204 requesting information regarding route availability status for reaching realms 200A-B via DSR 102C. DSR 102A may send DCRST message 204 towards DSR 102C.

DSR 102C may receive DCRST message 204 or another Diameter request message and may indicate route availability status of realms 200A-B via DSR 102C. In one embodiment, indicating route availability status may include providing no response. For example, as illustrated in FIG. 2B, no answer from DSR 102C (represented by box 206) may indicate that DSR 102C is still unable to reach realms 200A-B. In another embodiment, indicating route availability status may include providing a response. For example, DSR 102C may respond to DCRST message 204 with a message indicating route availability status. For instance, a response message may indicate that DSR 102C is able to reach realms 200A-B. In another instance, a response message may indicate that DSR 102C is unable to reach realms 200A-B.

Referring to the embodiment illustrated in FIG. 2C, DSR 102C may determine that a Diameter message can be communicated to realms 200A-B. For example, a network operator may repair a Diameter connection or link failure between each realm 200 and DSR 102C. After the repair, using one or more methods (e.g., timers, heartbeat packets and/or link probes), DSR 102C may detect or determine that realms 200A-B are currently reachable via DSR 102C.

In one embodiment, in response to determining that realms 200A-B are currently reachable, DSR 102C may generate a DNMM. The DNMM may include information indicating that realms 200A-B and/or nodes 100 of realms 200A-B are reachable via DSR 102C. For example, as illustrated in FIG. 2C, in response to route availability status information changing (e.g., realms 200A-B becoming reachable), DSR 102C may generate a Diameter transfer cluster allowed (DTCA) message 208 indicating that a Diameter message can be communicated to realms 200A-B and/or nodes of realms 200A-B via DSR 102C. In another embodiment, DSR 102C may generate DTCA message 208 in response to receiving a Diameter request message (e.g., a DCRST message).

DSR 102C may send or initiate sending DNMMs to one or more nodes. In one embodiment, peer DSR 102A may receive the DNMM. In response to receiving the DNMM, peer DSR 102A may send Diameter messages to realm 200A or realm 200B via DSR 102C. For example, as illustrated in FIG. 2C, DSR 102C may send a DTCA message 208 to peer nodes, such as DSRs 102A, 102B, and 102D. In response, the peer nodes (e.g., DSR 102A, 102B, and 102D) may configure Diameter message routing or relaying information so as to steer Diameter message traffic destined for realm 200A or realm 200B to DSR 102C. For example, after receiving DTCA message 208, Diameter message traffic destined for realm 200B may be steered to DSR 102C.

Figure 3A:
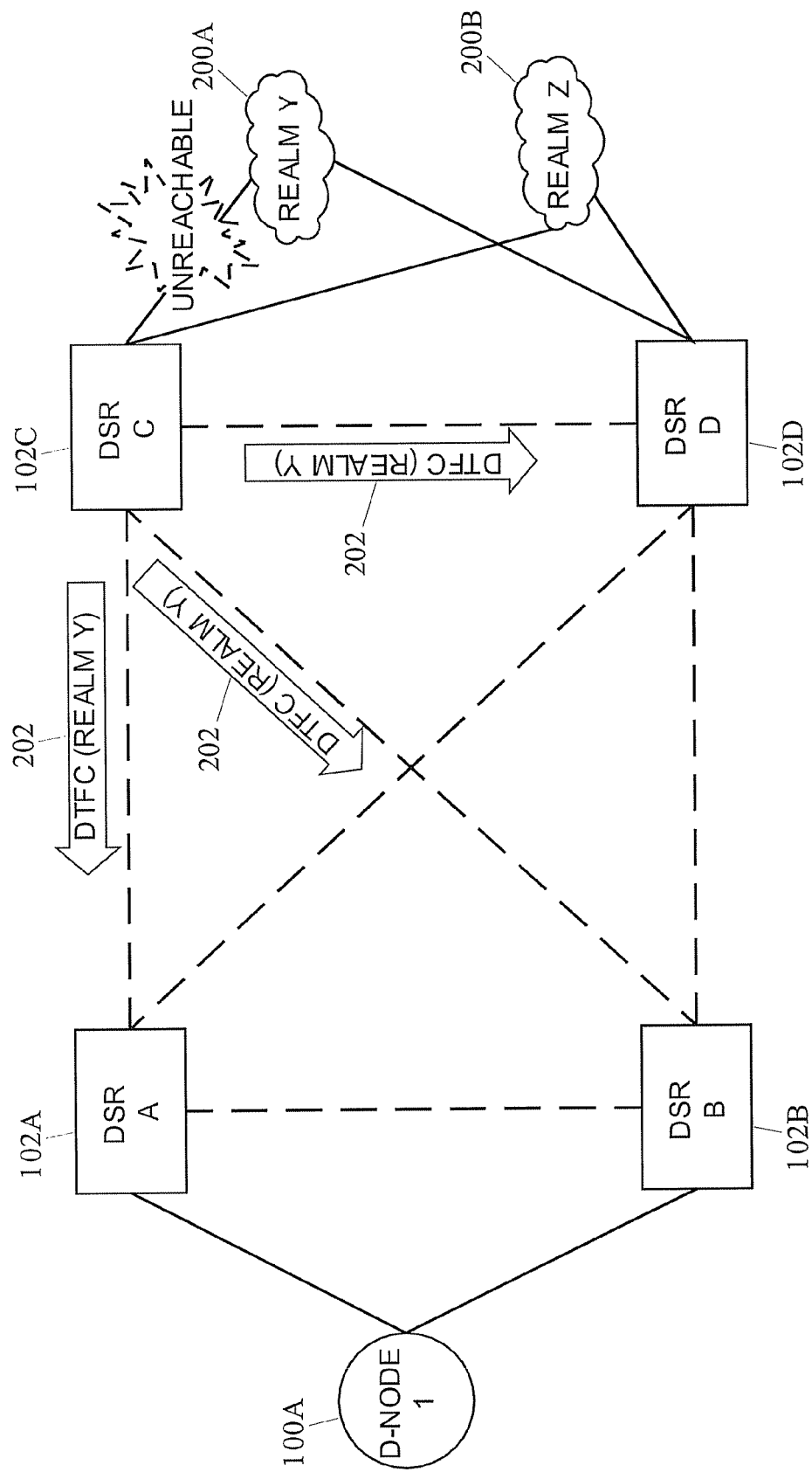
FIG. 3A is a network diagram illustrating a DSR in a communications network providing Diameter network management information indicating a realm is unreachable according to an embodiment of the subject matter described herein.
Figure 3B:
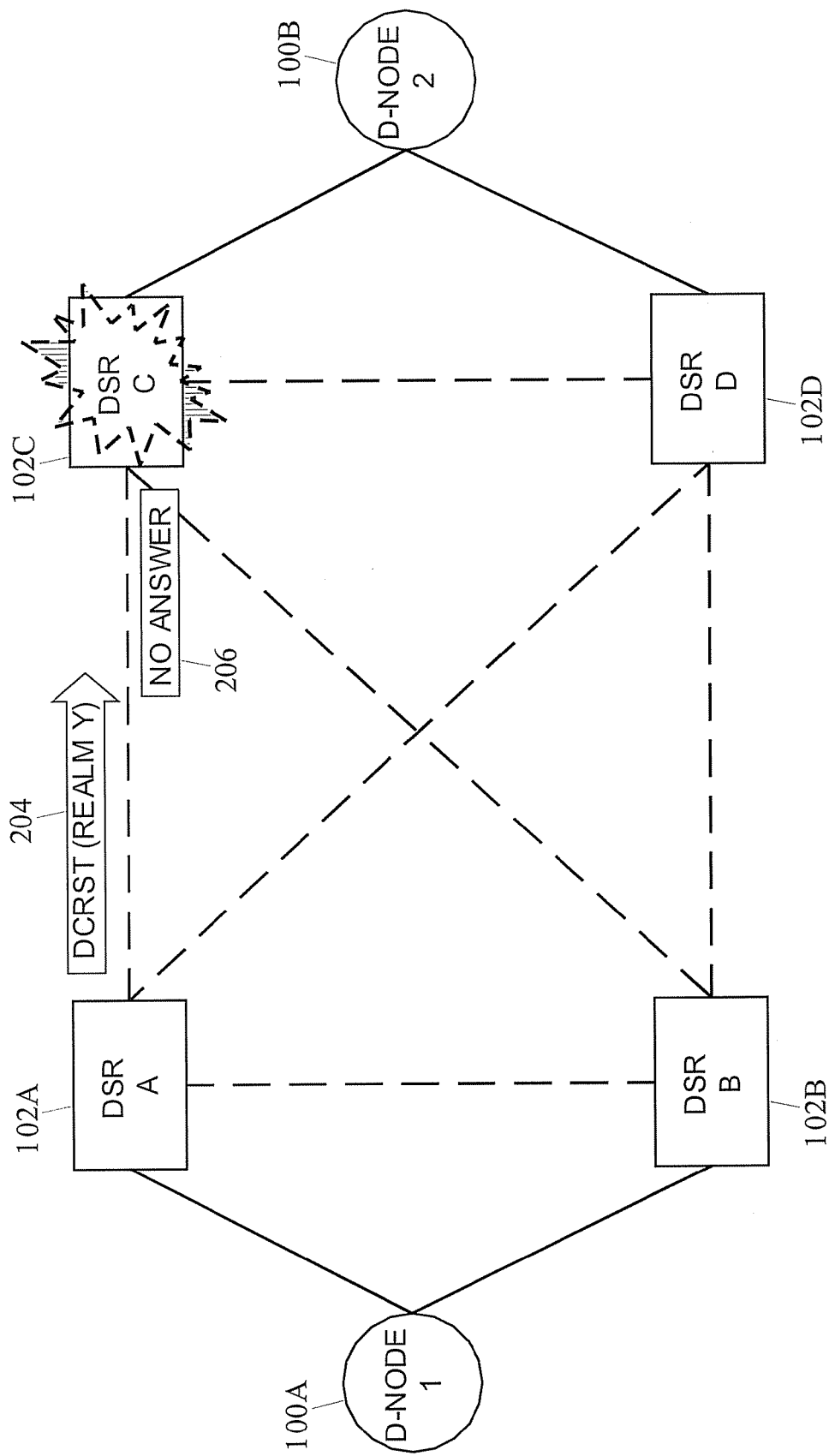
FIG. 3B is a network diagram illustrating a DSR in the communications network requesting Diameter network management information for a realm according to an embodiment of the subject matter described herein.
Figure 3C:
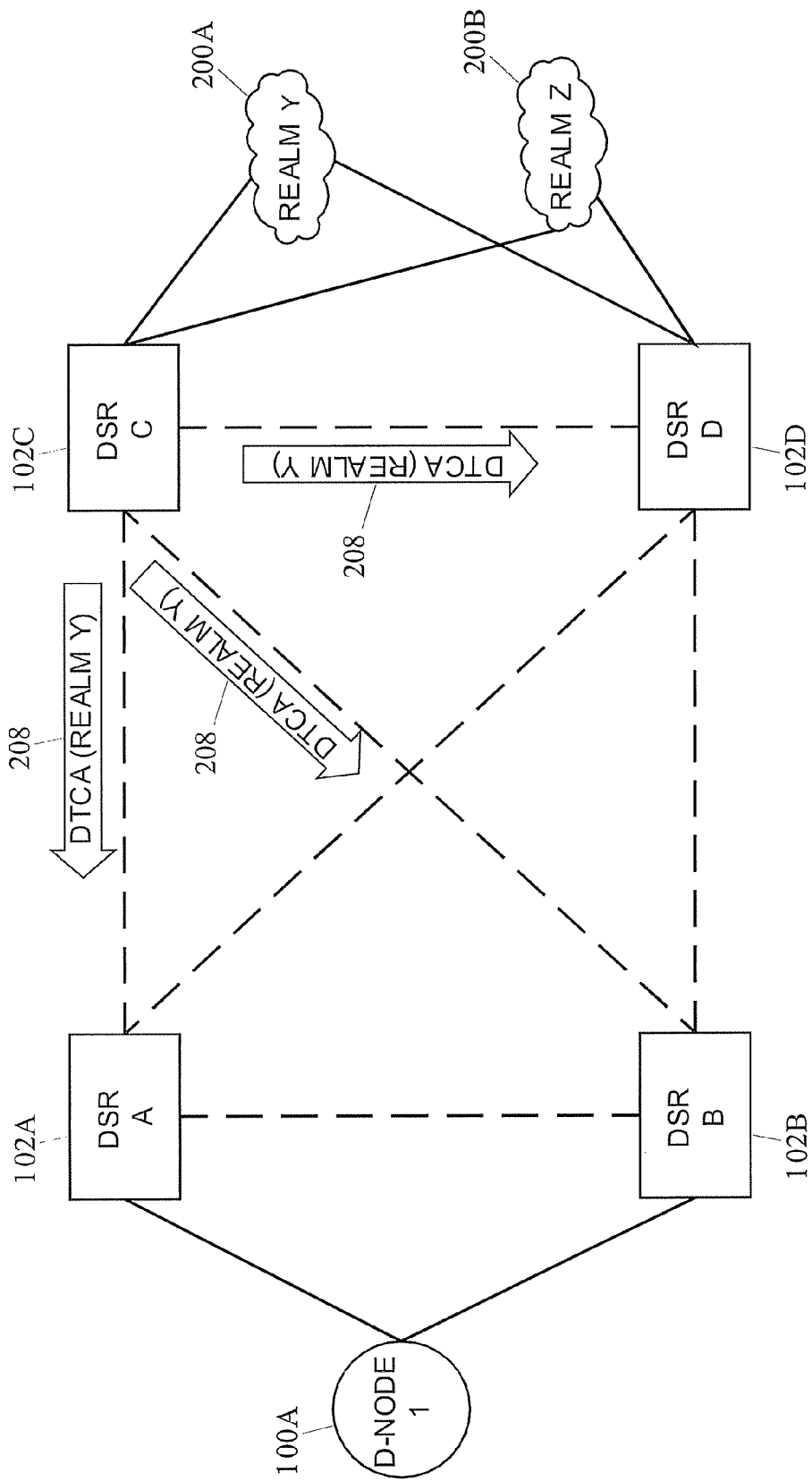
FIG. 3C is a network diagram illustrating a DSR in a communications network providing Diameter network management information indicating a realm is reachable according to an embodiment of the subject matter described herein.

FIGS. 3A-3C are network diagrams illustrating further examples of Diameter network management in an exemplary communications network according to embodiments of the subject matter described herein. Except as disclosed herein, the exemplary communications network of FIGS. 3A-3C is essentially the same as the network described in reference to FIGS. 1A-2C.

Referring to the embodiment illustrated in FIG. 3A, DSR 102C may provide Diameter network management information indicating realm 200A is unreachable. In one embodiment, DSR 102C may determine that Diameter messages cannot be communicated to realm 200A via DSR 102C. For example, using response timers and/or other methods (e.g., timers, heartbeat packets and/or link probes), DSR 102C may detect or determine that realm 200A is currently unreachable via DSR 102C.

In one embodiment, in response to determining that realm 200A is currently unreachable, DSR 102C may generate a DNMM. The DNMM may include information indicating that realm 200A and/or particular nodes 100 of realm 200A are unreachable via DSR 102C. For example, DSR 102C may generate a Diameter transfer cluster prohibited (DTCP) message 202 indicating that a Diameter message cannot be communicated to realm 200A via DSR 102C. In another embodiment, DSR 102C may generate DTCP message 202 in response to receiving a Diameter request message (e.g., a Diameter cluster route set test (DCRST) message).

DSR 102C may send or initiate sending the DNMMs to one or more Diameter nodes. In one embodiment, peer DSR 102A may receive the DNMM. In response to receiving the DNMM, peer DSR 102A may determine a different path for sending Diameter messages to realm 200A and may send the Diameter messages towards realm 200A via a different path. For example, as illustrated in FIG. 3A, DSR 102C may send DTCP messages 202 to peer DSRs, such as DSR 102A, 102B, and 102D. In response, the peer DSRs (e.g., DSR 102A, 102B, and 102D) may configure Diameter message routing or relaying information so as to steer Diameter message traffic destined for realm 200A generally away from DSR 102C. For instance, after receiving the DTFP message, Diameter message traffic destined for realm 200A may be relayed via DSR 102D.

Referring to the embodiment illustrated in FIG. 3B, after receiving a DNMM indicating that realm 200A is unreachable via DSR 102C, DSR 102A may periodically or aperiodically poll DSR 102C with a DNMM requesting information regarding whether DSR 102C is able to reach realm 200A. For example, as illustrated in FIG. 1B, DSR 102A may generate a DCRST message 204 requesting information regarding route availability status for reaching realm 200A via DSR 102C. DSR 102A may send DCRST message 204 towards DSR 102C.

DSR 102C may receive DCRST message 204 or another Diameter request message and may indicate route availability status of realm 200A via DSR 102C. In one embodiment, indicating route availability status may include providing no response. For example, as illustrated in FIG. 3B, no answer from DSR 102C (represented by box 206) may indicate that DSR 102C is still unable to reach realm 200A. In another embodiment, indicating route availability status may include providing a response. For example, DSR 102C may respond to DCRST message 204 with a message indicating route availability status. For instance, a response message may indicate that that DSR 102C is able to reach realm 200A. In another instance, a response message may indicate that that DSR 102C is unable to reach realm 200A.

Referring to the embodiment illustrated in FIG. 3C, DSR 102C may determine that a Diameter message can be communicated to realm 200A via DSR 102C. For example, a network operator may repair a failed Diameter connection or link between realm 200A and DSR 102C. After the repair, using one or more methods (e.g., timers, heartbeat packets and/or link probes), DSR 102C may detect or determine that realm 200A is currently reachable via DSR 102C.

In one embodiment, in response to determining that realm 200A is currently reachable, DSR 102C may generate a DNMM. The DNMM may include information indicating that realm 200A and/or particular nodes 100 of realm 200A are reachable via DSR 102C. For example, as illustrated in FIG. 2C, in response to route availability status information changing (e.g., realm 200A becoming reachable), DSR 102C may generate a Diameter transfer cluster allowed (DTCA) message 208 indicating that a Diameter message can be communicated to realm 200A and/or particular nodes 100 of realm 200A via DSR 102C. In another embodiment, DSR 102C may generate DTCA message 208 in response to receiving a Diameter request message (e.g., a DCRST message).

DSR 102C may send or initiate sending the DNMMs to one or more nodes. In one embodiment, peer DSR 102A may receive the DNMM. In response to receiving the DNMM, the peer DSR may send Diameter messages towards realm 200A via DSR 102C. For example, as illustrated in FIG. 3C, DSR 102C may send a DTCA message 208 towards peer DSRs, such as DSR 102A, 102B, and 102D. In response, the peer DSRs (e.g., DSR 102A, 102B, and 102D) may configure Diameter message routing or relaying information so as to steer Diameter message traffic destined for realm 200A to DSR 102C. For example, after receiving DTCA message 208, Diameter message traffic destined for realm 200A may be steered to DSR 102C.

Figure 4:
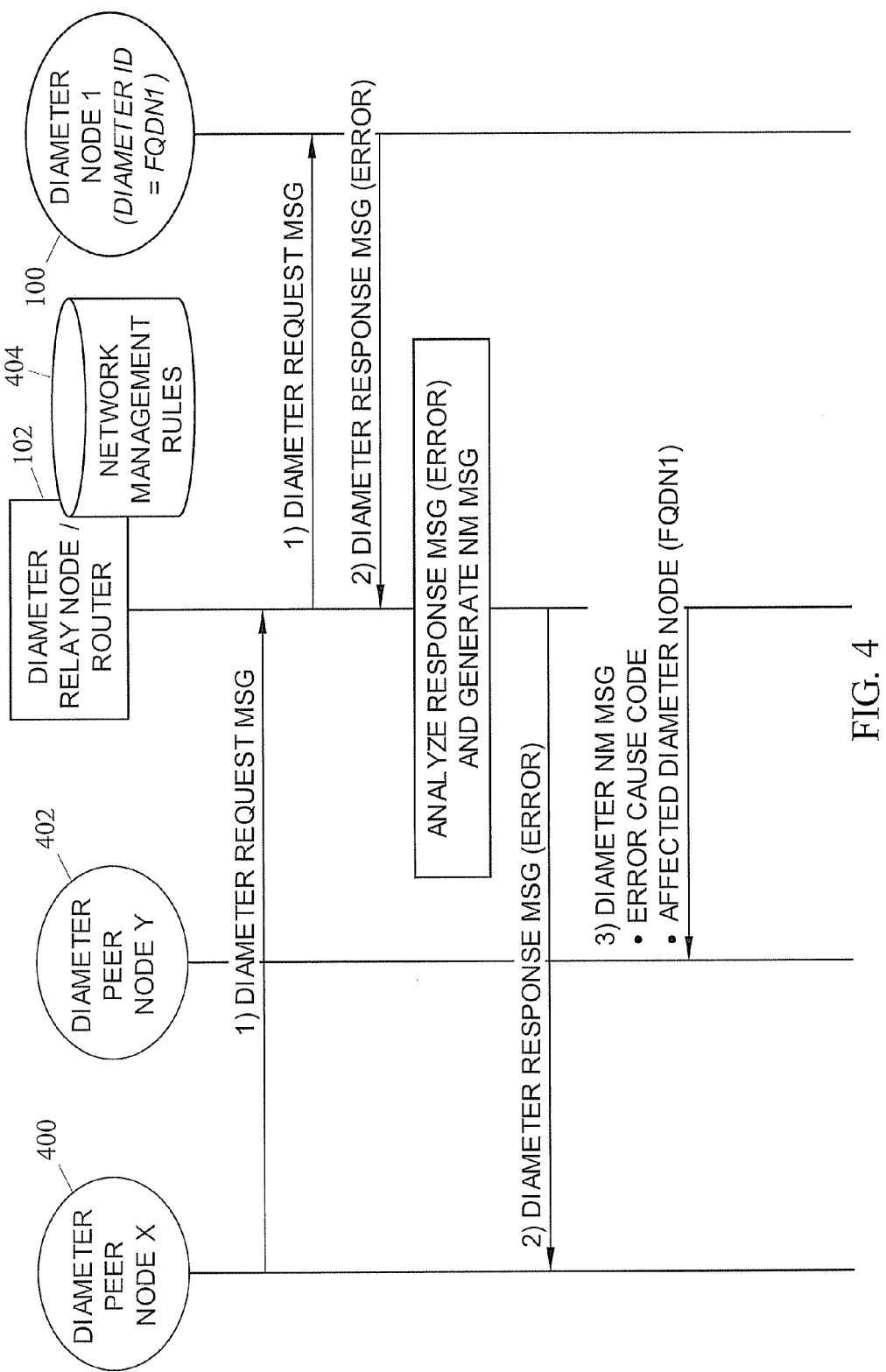
FIG. 4 is a message flow diagram illustrating a Diameter network management information broadcast according to an embodiment of the subject matter described herein.

FIG. 4 is a message flow diagram illustrating a Diameter network management information broadcast according to an embodiment of the subject matter described herein. In the embodiment illustrated in FIG. 4, Diameter peer node 400 and Diameter peer node 402 may be connected for communicating messages. For example, Diameter peer node 400 and Diameter peer node 402 may be capable of exchanging messages without using a DSR 102 as an intermediate.

DSR 102 may include or have access to a rules database 404. Rules database 404 may include any suitable data structure for storing or maintaining network management rules. For example, rules database 404 may include information for generating and/or providing network management information, e.g., DTFP messages, DTFA messages, DTCP messages, DTCA messages, DRST messages, and DCRST messages.

Diameter node 100 represents a node capable of implementing or using a Diameter protocol. For example, Diameter node 100 may be an HSS for providing authorization and authentication for subscribers.

Referring to the embodiment illustrated in FIG. 4, at step 1, a Diameter request message destined for Diameter node 100 may be sent to DSR 102 from Diameter peer node 400. After receiving the Diameter request message, DSR 102 may determine information for relaying or routing the Diameter request message to Diameter node 100. For example, DSR 102 may determine that Diameter node 100 is reachable. The Diameter request message may be sent from DSR 102 to Diameter node 100.

The Diameter request message may be received at Diameter node 100. Diameter node 100 may examine message and determine that it unable to perform request. For example, the Diameter request message may be for a particular Diameter application or subsystem, such as an Diameter authentication application. In this example, Diameter node 100, or a Diameter application executing at Diameter node 100, may not have available resources to handle the request. In another example, Diameter node 100 may not include an appropriate Diameter application or subsystem to handle the Diameter request message. Diameter node 100 may generate a Diameter response message indicating that an error has occurred, e.g., message may include an error code or other information.

At step 2, a Diameter response message including an error code may be sent from Diameter node 100 to DSR 102. The Diameter response message may be received at DSR 102. DSR 102 may examine or analyze the Diameter response message. In one embodiment, DSR 102 may use rules database 404 in analyzing the Diameter response message. Using information from rules database 404 and information from the Diameter response message (e.g., an error code), DSR 102 may generate a DNMM. The DNMM may include the error code from the Diameter response message and/or information for indicating that Diameter node 100 is unable to handle particular Diameter request messages. In one embodiment, after generating the DNMM, the Diameter response message including the error code may be sent from DSR 102 towards Diameter peer node 400. In another embodiment, the Diameter response message including the error code may be sent before a DNMM is generated.

At step 3, the generated DNMM may be sent from DSR 102 to one or more Diameter nodes, such as Diameter peer node 402. Diameter peer node 400 and Diameter peer node 402 may receive the respective messages and may use the messages for making subsequent decisions. For example, Diameter node 402 may use the information from the DNMM and may send Diameter request messages towards a different Diameter node other than Diameter node 100. Similarly, Diameter node 400 may use the information from the Diameter response message and may send Diameter request messages towards a different Diameter node other than Diameter node 100.

Figure 5:
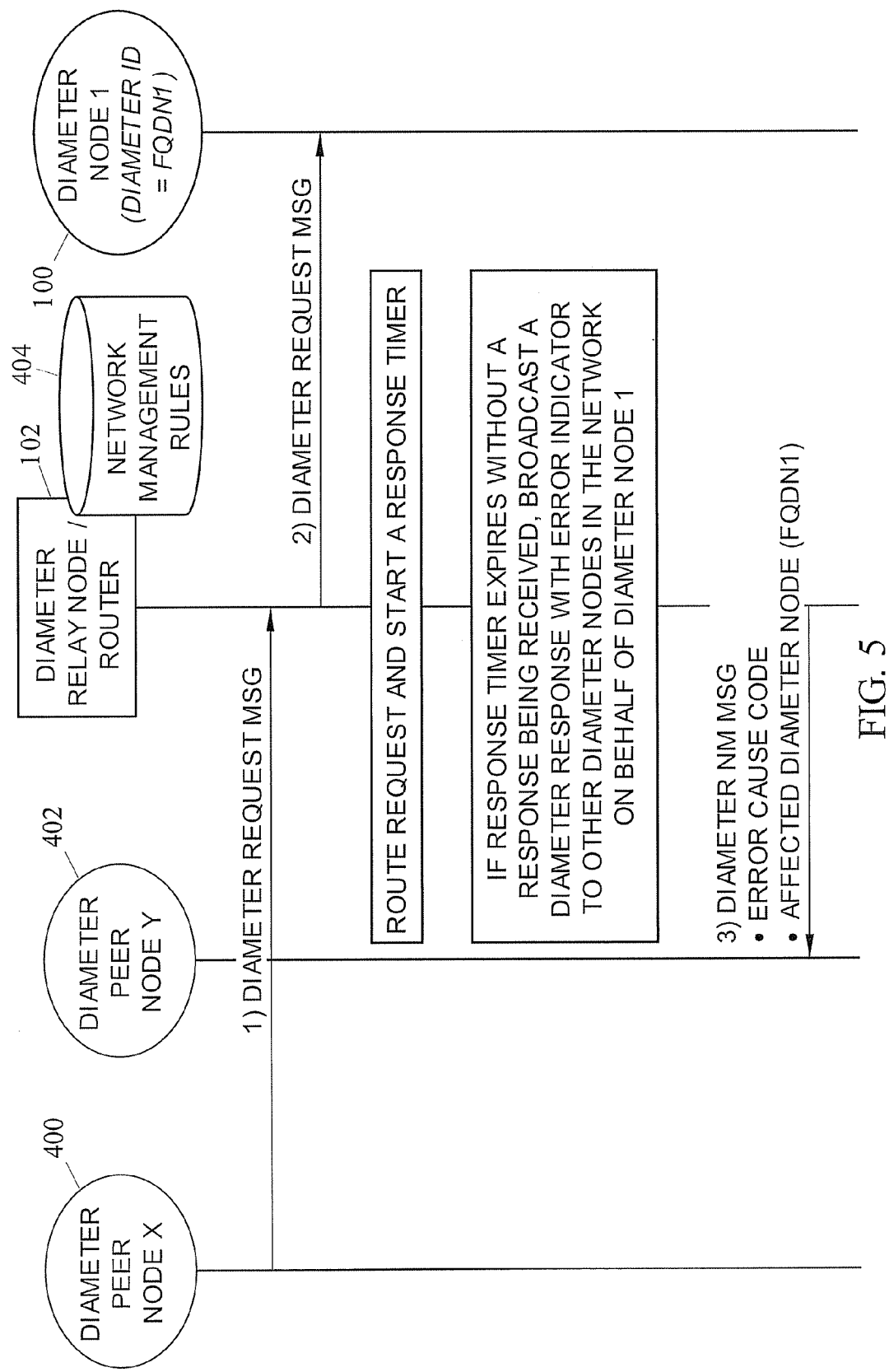
FIG. 5 is a message flow diagram illustrating a Diameter network management information broadcast according to another embodiment of the subject matter described herein.

FIG. 5 is a message flow diagram illustrating a Diameter network management broadcast according to another embodiment of the subject matter described herein. Except as disclosed herein, nodes depicted in FIG. 5 is essentially the same as described in reference to FIG. 4.

Referring to the embodiment illustrated in FIG. 5, at step 1, a Diameter request message destined for Diameter node 100 may be sent to DSR 102 from Diameter peer node 400. After receiving the Diameter request message, DSR 102 may determine information for relaying or routing the Diameter request message towards Diameter node 100. For example, DSR 102 may determine that Diameter node 100 is reachable. The Diameter request message may be sent from DSR 102 towards Diameter node 100.

In one embodiment, DSR 102 may initiate a response timer. The response timer may be used for triggering actions in response to an amount of time elapsing. For example, rules database 404 may include preconfigured time amounts for receiving a response to particular Diameter request messages. If the response timer expires before a corresponding response message is received, DSR 102 may perform one or more actions, e.g., send or broadcast a DNMM to other nodes (e.g., Diameters 100). The DNMM may include information indicating an error and/or information for indicating that Diameter node 100 is unable to handle particular Diameter request messages.

In one embodiment, DSR 102 may generate a Diameter Watchdog Request (DWR) message (e.g., Diameter message code 280) in response to failing to observe or detect Diameter communications with Diameter node 100 within a predetermined period of time. The DWR message may be communicated from DSR 102 to Diameter node 100. Failure to receive an associated Diameter Watchdog Answer (DWA) message from Diameter node 100 within a predetermined timeout period may be used to confirm that a network management issue exists. DSR 102 may use this information in generating DNMMs or other Diameter network management information. DSR 102 may communicate the Diameter network management information to various destinations, e.g., other Diameter nodes (e.g., peer DSR 102) in the communications network and/or internal Diameter message processors associated with DSR 102.

In one embodiment, where an associated DWA message is received from Diameter node 100, DSR 102 may examine the DWA message and extract message information, e.g., error information stored in one or more AVPs in the message, such as information in an error-message AVP, a failed AVP, an Origin_State_ID AVP, et cetera. DSR 102 may use this information in generating DNMMs or other Diameter network management information. DSR 102 may communicate the Diameter network management information to various destinations.

At step 3, the generated DNMM may be sent from DSR 102 to one or more nodes, such as Diameter peer node 400 and Diameter peer node 402. Diameter peer node 400 and Diameter peer node 402 may receive the DNMM and may use the messages for making subsequent decisions. For example, Diameter node 402 may use the information from the DNMM and may send Diameter request messages towards a different Diameter node other than Diameter node 100.

Figure 6:
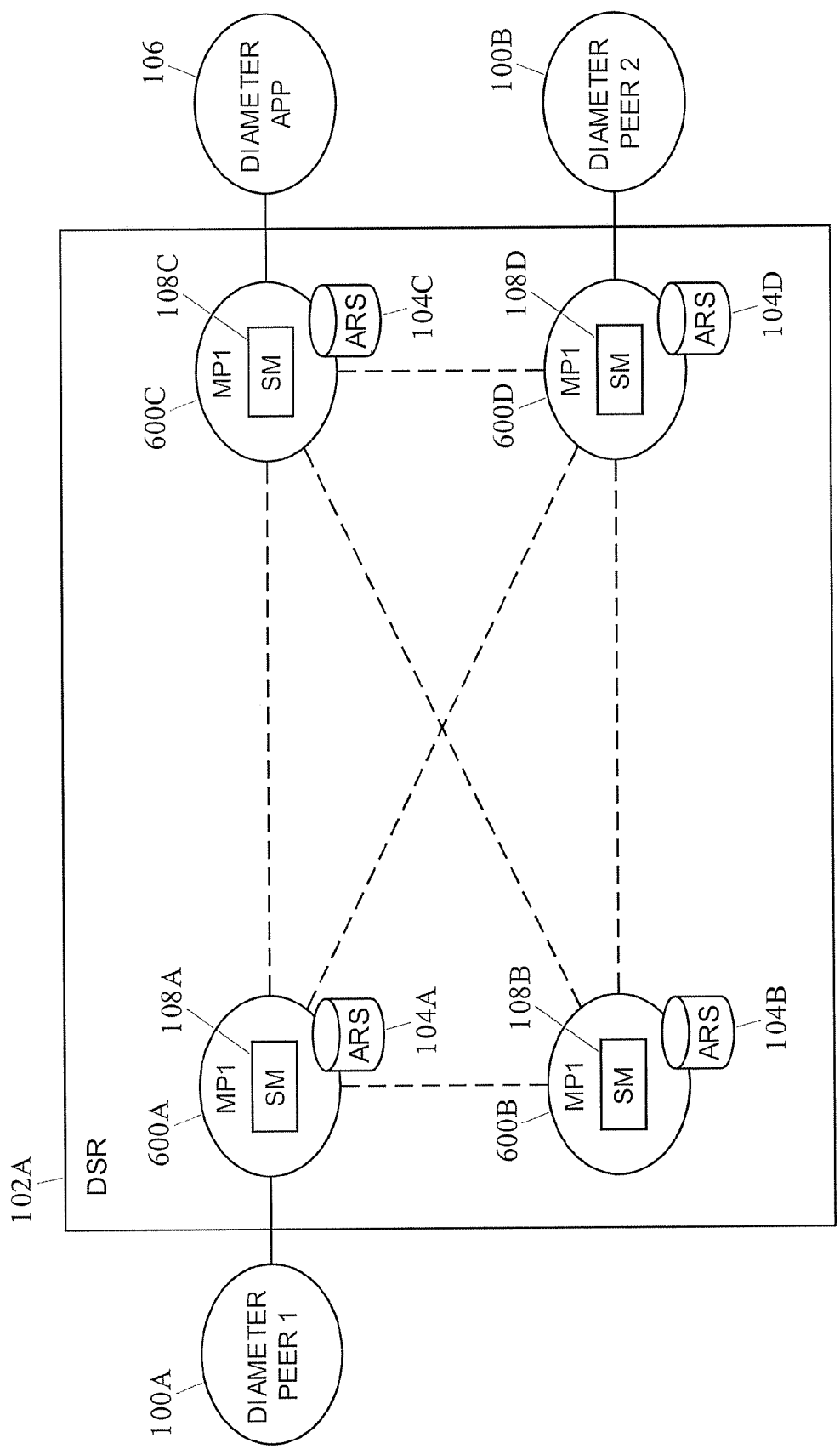
FIG. 6 is a block diagram illustrating an exemplary DSR for providing Diameter network management information according to an embodiment of the subject matter described herein.

FIG. 6 is block diagram illustrating an exemplary DSR 102 for providing Diameter network management information according to an embodiment of the subject matter described herein.

Referring to the embodiment illustrated in FIG. 6, DSR 102A includes one or more message processors (MPs) 600A-D for sending, receiving, and/or processing various messages, such as Diameter messages. MPs 600A-D may include one or more communications interfaces for communicating signaling messages (e.g., Diameter messages and DNMMs) and/or inter-MP messages. For example, MPs 600A-D may send and receive Diameter request messages between external entities, e.g., Diameter node 100A and Diameter node 100B. MPs 600A-D may also send and receive messages (e.g., Diameter messages and other non-Diameter messages) between internal entities. For example, MP 600A may screen a Diameter message and relay it to MP 600C for further processing.

MPs 600A-D may include or have access to one or more network management (NM) modules, e.g., NM modules 602A-D. NM module 602A-D may include any functionality described herein associated with determining, generating, and/or providing Diameter NM information. In one embodiment, NM modules 602A-D may perform one or more steps for answer-based NM broadcasting. For example, NM module 602D may determine or initiate determining whether a node or a group of nodes (e.g., a realm) is reachable via DSR 102C. For instance, NM module 602D may use response timers for determining whether a response to a request message is received in a timely manner. NM module 602D may also generate or initiate generating a DNMM. The DNMM may include NM information, such as node availability information, Diameter application availability information, path availability information, and congestion information. NM module 602D may also send or initiate sending DNMMs towards various entities, e.g., MPs 600A-C, Diameter nodes 100A, DSR 102B, DSR 102C, and DSR 102D.

In one embodiment, MPs 600A-D and NM modules 602A-D may include functionality for handling particular messages. For example, NM module 602A at MP 600A may handle communications with Diameter node 100A and NM module 602D at MP 600D may handle communications with Diameter node 100B.

MPs 600A-D and/or NM modules 602A-B may include or have access to one or more databases, such as NM rules databases 404A-D. NM rules databases 404A-D may include any suitable data structure for storing or maintaining information usable for determining when to provide NM information and rules for determining which entities receive the NM information. In one embodiment, rules database 404 or another database may store Diameter NM information for various nodes and/or realms, e.g., congestion information and path availability status.

In one embodiment where a DSR 102 includes multiple processors (e.g., a distributed architecture), each processor (e.g., an MP 600) may be capable of providing Diameter NM. For example, MPs 600A-D may provide DNMMs between each other. In another example, MP 600A may provide DNMMs to particular entities (e.g., Diameter node 100A) and/or locations (e.g., Realm 200A) and MP 600B may provide DNMMs to other entities (e.g., Diameter node 100B) and/or locations (e.g., Realm 200B).

Figure 7:
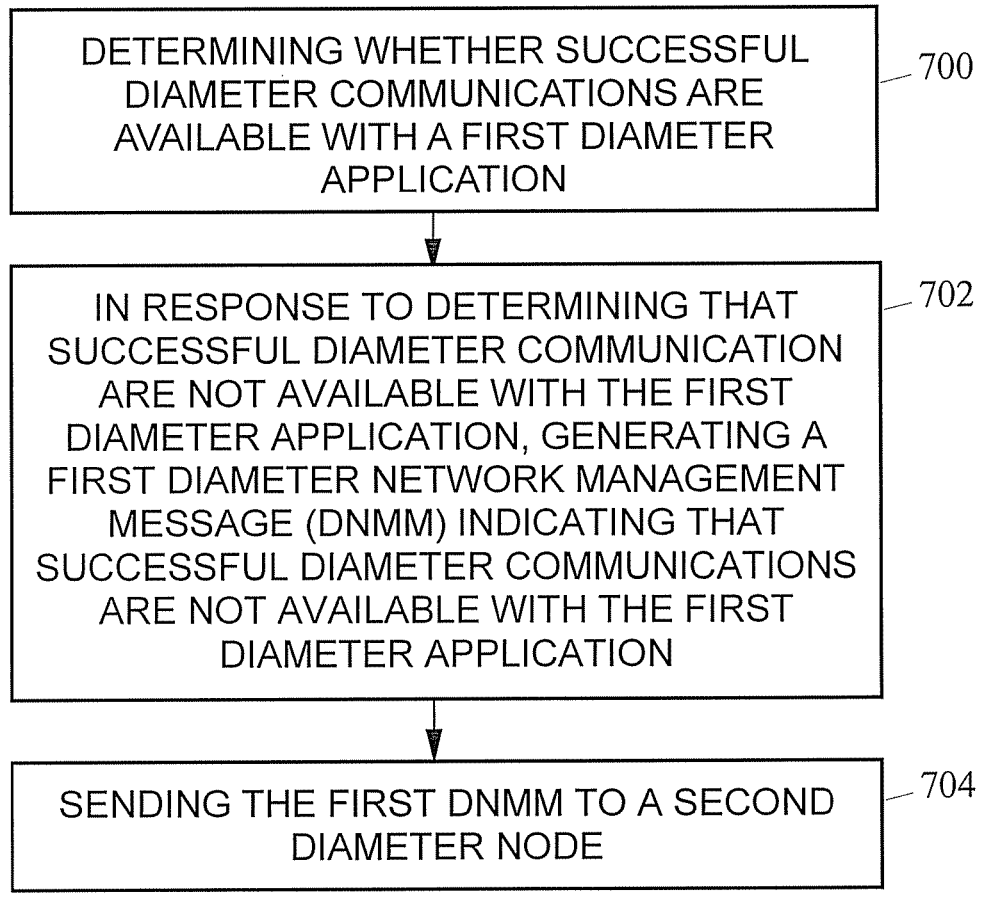
FIG. 7 is a flow chart illustrating exemplary steps for providing Diameter network management information according to an embodiment of the subject matter described herein.

FIG. 7 is a flow chart illustrating exemplary steps for providing according to an embodiment of the subject matter described herein. In one embodiment, one or more exemplary steps described herein may be performed at or performed by DSR 102. In another embodiment, one or more exemplary steps described herein may be performed at or performed by a NM module located at various nodes, e.g., Diameter node 100B.

Referring to the embodiment illustrated in FIG. 7, at step 700 a DSR determines whether successful Diameter communications are available with a first Diameter application. For example, as illustrated in FIG. 1A, DSR 102C may determine that Diameter node 100B is unreachable via DSR 102C and that communications with a Diameter application executing at Diameter node 100B are unavailable.

At step 702, in response to determining that successful Diameter communications are not available with a first Diameter application, the DSR generates a first Diameter network management message (DNMM) indicating that successful Diameter communications are not available with the first Diameter application. For example, as illustrated in FIG. 1A, DSR 102C may generate a DTFP message 104 indicating that a Diameter node 100B is unreachable via DSR 102C and/or indicating that communications with a Diameter application executing at Diameter node 100B are unavailable.

In one embodiment, a DNMM may include global Diameter network management information or a portion thereof. For example, a DNMM may indicate availability status for all Diameter applications, nodes 100, and/or realms 200 associated with a communications network. In another example, a DNMM may indicate availability status for all Diameter applications, nodes 100, and/or realms 200 associated a DSR 102. In yet another example, a DNMM may indicate availability status for particular Diameter applications, nodes 100 and/or particular realms 200 associated a DSR 102.

In one embodiment, a DNMM may be a DTFP message, a DTFA message, a DRST message, a DCTP message, a DTCA message, and a DCRST message.

At step 704, the first DNMM may be sent to a second Diameter node associated with the DSR. For example, as illustrated in FIG. 1A, DSR 102C may send a DTFP message 104 towards peer DSRs, such as DSR 102A, 102B, and 102D. In response, the peer DSRs (e.g., DSR 102A, 102B, and 102D) may configure Diameter message routing or relaying information so as to steer Diameter message traffic destined for the Diameter application executing at Diameter node 100B generally away from DSR 102C.

While various network management functionality is disclosed above in relation to particular DSRs 102 (e.g., DSR 102A and DSR 102C of FIGS. 1A-3C), it will be understood that such functionality is illustrative and that a given DSR 102 (e.g., DSR 102B and DSR 102D of FIGS. 1A-3C) or other appropriate Diameter node may include similar, different, and/or additional functionality.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing Diameter network management information in a communications network, the method comprising:
   at a Diameter signaling router (DSR):
      determining whether successful Diameter communications are available with a first Diameter application in response to receiving a Diameter message from a first Diameter node, wherein determining whether successful Diameter communications are available with the first Diameter application includes sending a Diameter request message to the first Diameter application and determining that successful Diameter communications are not available with the first Diameter application in response to receiving a response message indicating an error or communications issue;
      in response to determining that successful Diameter communications are not available with the first Diameter application, generating a first Diameter network management message (DNMM) indicating that successful Diameter communications are not available with the first Diameter application; and
      sending the first DNMM to a second Diameter node distinct from the DSR and the first Diameter node.

2. The method of claim 1 wherein determining whether successful Diameter communications are available with the first Diameter application includes sending a Diameter request message to the first Diameter application and determining that successful communications with the first Diameter application are not available in response to failing to receive, at the DSR, a response in a predetermined amount of time.

3. The method of claim 2 wherein a Diameter request message is a Diameter watchdog request (DWR) message.

4. The method of claim 1 comprising:
   at the second Diameter node:
      receiving the first DNMM;
      in response to receiving the first DNMM, generating a Diameter network management request message requesting information regarding availability status of the first Diameter application via the DSR; and
      sending the Diameter network management request message to the DSR.

5. The method of claim 1 comprising:
   at the second Diameter node:
      receiving the first DNMM; and
      in response to receiving the first DNMM, determining a different path for sending a Diameter message towards the first Diameter application and sending the Diameter message to the first Diameter application via a different path.

6. The method of claim 4 comprising:
   at the DSR:
      receiving the Diameter network management request message; and
      in response to receiving the Diameter network management request message, indicating to the second Diameter node availability status of the first Diameter application via the DSR.

7. The method of claim 6 wherein indicating to the second Diameter node availability status of the first Diameter application via the DSR includes one of providing no response indicating that availability status has not changed, providing a response, providing a response indicating that a Diameter message cannot be communicated to the first Diameter application via the DSR, and providing a response indicating that a Diameter message can be communicated to the first Diameter application via the DSR.

8. The method of claim 1 wherein the DSR comprises a Diameter relay agent, a Diameter redirect agent, a Diameter translation agent, or a Diameter proxy agent and wherein the first and second Diameter nodes each comprise a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a policy and charging enforcement function (PCEF), a policy and charging rules function (PCRF), a subscriber profile repository (SPR), a Diameter peer node, a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a database, a computing platform, or a second DSR.

9. The method of claim 1 comprising:
at the DSR and after determining that successful Diameter communications are not available with the first Diameter application:
determining whether successful Diameter communications have become available with the first Diameter application;
in response to determining that successful Diameter communications have become available with the first Diameter application, generating a second DNMM indicating that successful Diameter communications have become available with the first Diameter application; and
sending the second DNMM towards the second Diameter node.

10. The method of claim 1 wherein determining whether successful Diameter communications are available with the first Diameter application includes determining that Diameter messages cannot be communicated to a realm associated with the first Diameter application and wherein the first DNMM indicates that Diameter messages cannot be communicated to the realm via the DSR.

11. The method of claim 10 comprising:
at the second Diameter node:
receiving the first DNMM indicating that Diameter message cannot be communicated to the realm via the DSR; and
in response to receiving the first DNMM, determining a different path for sending a Diameter message to the realm and sending the Diameter message to the realm via a different path.

12. The method of claim 10 wherein the realm comprises one of a cluster including Diameter nodes, a network segment including Diameter nodes, a domain including Diameter nodes, a subnet including Diameter nodes, an address space including Diameter nodes, a geographical location including Diameter nodes, a logical location including Diameter nodes, a logical group including Diameter nodes, or a physical group including Diameter nodes.

13. The method of claim 1 wherein the first DNMM comprises one of a Diameter transfer prohibited (DTFP) message, a Diameter transfer allowed (DTFA) message, a Diameter route set test (DRST) message, a Diameter transfer cluster prohibited (DTCP) message, a Diameter transfer cluster allowed (DTCA) message, or a Diameter cluster route set test (DCRST) message.

14. A system for providing Diameter network management information in a communications network, the system comprising:
a Diameter signaling router (DSR), the DSR comprising:
a Diameter communications interface; and
a network management module for determining whether successful Diameter communications are available with a first Diameter application in response to receiving a Diameter message from a first Diameter node, for, in response to determining that successful Diameter communications are not available with the first Diameter application, generating a first Diameter network management message (DNMM) indicating that successful Diameter communications are not available with the first Diameter application, and for sending the first DNMM to a second Diameter node distinct from the DSR and the first Diameter node, wherein determining whether successful Diameter communications are available with the first Diameter application includes sending a Diameter request message to the first Diameter application and determining that successful Diameter communications are not available with the first Diameter application in response to receiving a response message indicating an error or communications issue.

15. The system of claim 14 wherein the network management module determines whether successful Diameter communications are available with the first Diameter application by sending a Diameter request message to the first Diameter application and using a response timer for determining whether a corresponding response is received in a predetermined amount of time.

16. The system of claim 15 wherein a Diameter request message is a Diameter watchdog request (DWR) message.

17. The system of claim 14 wherein the network management module receives a Diameter network management request message transmitted by the second Diameter node in response to receiving the first DNMM, and, in response to receiving the Diameter network management request message, indicates to the second Diameter node availability status of the first Diameter application via the DSR.

18. The method of claim 17 wherein indicating to the second Diameter node availability status of the first Diameter application via the DSR includes one of providing no response indicating that availability status has not changed, providing a response, providing a response indicating that a Diameter message cannot be communicated to the first Diameter application via the DSR, and providing a response indicating that a Diameter message can be communicated to the first Diameter application via the DSR.

19. The system of claim 14 wherein the DSR comprises a Diameter relay agent, a Diameter redirect agent, a Diameter translation agent, and a Diameter proxy agent and wherein the first and second Diameter nodes each comprise a mobility management entity (MME), a home subscriber server (HSS) and/or authentication, authorization, and accounting (AAA) server, a Bearer Binding and Event Reporting Function (BBERF), a serving gateway (SGW), a packet data network gateway (PDN GW), a policy and charging enforcement function (PCEF), a policy and charging rules function (PCRF), a subscriber profile repository (SPR), a Diameter peer node, a Diameter agent, a network node, a policy engine, a policy server, an application function (AF), an application server, a Diameter signaling agent, a long term evolution (LTE) node, an Internet protocol (IP) multimedia subsystem (IMS) network node, a server, a node, a database, a computing platform, or a second DSR.

20. The system of claim 14 wherein, after determining that successful Diameter communications are not available with the first Diameter application, the network management module determines whether successful Diameter communications have become available with the first Diameter application, and, in response to determining that successful Diameter communications have come available with the first Diameter application, generates a second DNMM indicating that successful Diameter communications have become available with the first Diameter application, and sends the second DNMM to the second Diameter node.

21. The system of claim 14 wherein determining whether successful Diameter communications are available with the first Diameter application includes determining whether Diameter messages can be communicated to a realm associated with the first Diameter application and wherein the first DNMM indicates that Diameter messages cannot be communicated to the realm via the DSR.

22. The system of claim 14 wherein the first DNMM includes a Diameter transfer prohibited (DTFP) message, a Diameter transfer allowed (DTFA) message, a Diameter route set test (DRST) message, a Diameter transfer cluster prohibited (DTCP) message, a Diameter transfer cluster allowed (DTCA) message, or a Diameter cluster route set test (DCRST) message.

23. The system of claim 21 wherein the realm includes a cluster including Diameter nodes, a network segment including Diameter nodes, a domain including Diameter nodes, a subnet including Diameter nodes, an address space including Diameter nodes, a geographical location including Diameter nodes, a logical location including Diameter nodes, a logical group including Diameter nodes, or a physical group including Diameter nodes.

24. A non-transitory computer readable medium having stored thereon executable instructions that when executed by the processor of a computer control the computer to perform steps comprising:

at a Diameter signaling router (DSR):
determining whether successful Diameter communications are available with a first Diameter application in response to receiving a Diameter message from a first Diameter node, wherein determining whether successful Diameter communications are available with the first Diameter application includes sending a Diameter request message to the first Diameter application and determining that successful Diameter communications are not available with the first Diameter application in response to receiving a response message indicating an error or communications issue;
in response to determining that successful Diameter communications are not available with the first Diameter application, generating a first Diameter network management message (DNMM) indicating that successful Diameter communications are not available with the first Diameter application; and
sending the first DNMM to a second Diameter node distinct from the DSR and the first Diameter node.

* * * * *